United States Patent
Kriesels et al.

(10) Patent No.: US 10,858,918 B2
(45) Date of Patent: Dec. 8, 2020

(54) METHOD AND SYSTEM FOR LINING A TUBULAR

(71) Applicant: SHELL OIL COMPANY, Houston, TX (US)

(72) Inventors: Petrus Cornelis Kriesels, Rijswijk (NL); Boo Young Yang, Rijswijk (NL); Heather Laurie Gower, Rijswijk (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/397,861

(22) Filed: Apr. 29, 2019

(65) Prior Publication Data
US 2019/0257180 A1 Aug. 22, 2019

Related U.S. Application Data

(63) Continuation of application No. 15/121,468, filed as application No. PCT/EP2015/054115 on Feb. 27, 2015, now Pat. No. 10,316,628.

(30) Foreign Application Priority Data

Feb. 27, 2014 (EP) ..................................... 14157013

(51) Int. Cl.
 *E21B 43/10* (2006.01)
 *F16L 58/10* (2006.01)

(52) U.S. Cl.
 CPC .......... *E21B 43/108* (2013.01); *E21B 43/105* (2013.01); *F16L 58/1009* (2013.01); *F16L 58/1036* (2013.01)

(58) Field of Classification Search
CPC .. E21B 43/105; E21B 43/108; F16L 58/1009; F16L 58/1036
See application file for complete search history.

(56) References Cited

U.S. PATENT DOCUMENTS

| | | | |
|---|---|---|---|
| 3,354,129 A | 11/1967 | Edmonds et al. | |
| 3,489,220 A | * 1/1970 | Kinley | E21B 29/10 166/277 |
| 3,744,530 A | 7/1973 | Perry | |
| 3,785,193 A | 1/1974 | Kinley et al. | |

(Continued)

FOREIGN PATENT DOCUMENTS

| CN | 1038506 A | 1/1990 |
|---|---|---|
| CN | 1171292 A | 1/1998 |

(Continued)

OTHER PUBLICATIONS

International Search Report and Written Opinion received for PCT Patent Application No. PCT/EP2015/054115, dated Aug. 6, 2015, 11 pages.

*Primary Examiner* — Daniel P Stephenson

(57) ABSTRACT

A liner having an outer surface coated with a fluid absorbing coating is cladded to a tubing string by inserting the folded liner into the tubing string and then unfolding the liner against the tubing string. The liner may be a long single thin foil corrosion resistant liner coated with a sticky glue and a hygroscopic and/or other fluid absorbing coating to absorb fluid pockets trapped between the tubing and liner and inhibit corrosion and leakage of, the elongate tubing string.

24 Claims, 14 Drawing Sheets

(56) References Cited

U.S. PATENT DOCUMENTS

| | | | | |
|---|---|---|---|---|
| 4,863,365 A | * | 9/1989 | Ledoux | B29C 63/343 425/343 |
| 4,867,921 A | * | 9/1989 | Steketee, Jr. | B29C 53/10 264/36.17 |
| 5,034,180 A | * | 7/1991 | Steketee, Jr. | B29C 48/09 264/516 |
| 5,068,043 A | | 11/1991 | Thigpen et al. | |
| 5,186,987 A | * | 2/1993 | Imoto | B32B 5/26 428/34.5 |
| 5,337,823 A | | 8/1994 | Nobileau | |
| 5,346,658 A | * | 9/1994 | Gargiulo | B29B 13/024 156/287 |
| 5,385,173 A | * | 1/1995 | Gargiulo | E03F 3/06 138/118 |
| 5,395,472 A | * | 3/1995 | Mandich | B29C 65/4815 156/287 |
| 5,403,120 A | | 4/1995 | Stekette, Jr. | |
| 5,447,665 A | * | 9/1995 | Steketee, Jr. | B26D 3/163 264/36.17 |
| 5,487,411 A | * | 1/1996 | Goncalves | F16L 55/165 138/97 |
| 5,494,106 A | * | 2/1996 | Gueguen | E21B 29/10 166/277 |
| 5,653,555 A | | 8/1997 | Catallo | |
| 5,671,778 A | * | 9/1997 | Sakuragi | B29C 63/0013 138/125 |
| 5,785,120 A | * | 7/1998 | Smalley | E21B 29/10 166/55 |
| 5,794,702 A | * | 8/1998 | Nobileau | E21B 43/105 166/380 |
| 5,934,332 A | * | 8/1999 | Rodriguez | B29C 53/086 138/119 |
| 6,058,978 A | * | 5/2000 | Paletta | B29C 63/343 138/98 |
| 6,103,052 A | | 8/2000 | Kamiyama et al. | |
| 6,302,983 B1 | * | 10/2001 | Agren | B29C 57/02 156/273.7 |
| 6,575,240 B1 | * | 6/2003 | Cook | E21B 29/10 166/206 |
| 6,723,266 B1 | * | 4/2004 | Lippiatt | B29C 53/086 264/173.17 |
| 7,037,043 B1 | * | 5/2006 | Crabtree | F16L 55/165 138/98 |
| 7,144,980 B2 | | 12/2006 | Sun et al. | |
| 7,159,666 B2 | * | 1/2007 | Nobileau | E21B 17/08 166/207 |
| 7,258,141 B2 | * | 8/2007 | Catha | F16L 55/1653 138/114 |
| 7,926,561 B2 | | 4/2011 | Berg | |
| 8,069,900 B2 | * | 12/2011 | Nobileau | E21B 43/103 160/380 |
| 10,316,628 B2 | * | 6/2019 | Kriesels | E21B 43/105 |
| 2006/0052936 A1 | | 3/2006 | Duggan et al. | |
| 2006/0159791 A1 | | 7/2006 | Kamiyama et al. | |
| 2006/0289157 A1 | | 12/2006 | Rao | |
| 2007/0095532 A1 | | 5/2007 | Head et al. | |
| 2007/0267191 A1 | | 11/2007 | Pfeiffer et al. | |
| 2008/0110616 A1 | | 5/2008 | Nobileau | |
| 2009/0194276 A1 | | 8/2009 | Sheng | |
| 2010/0075078 A1 | | 3/2010 | Quitter | |
| 2010/0154187 A1 | | 6/2010 | Kamiyama et al. | |
| 2010/0247794 A1 | | 9/2010 | Bailey et al. | |
| 2012/0312407 A1 | | 12/2012 | Muhlin et al. | |
| 2014/0305535 A1 | | 10/2014 | Anderson et al. | |
| 2016/0362968 A1 | | 12/2016 | Kriesels et al. | |
| 2017/0002969 A1 | * | 1/2017 | Bontus | F16L 55/1653 |
| 2019/0257180 A1 | * | 8/2019 | Kriesels | E21B 43/105 |

FOREIGN PATENT DOCUMENTS

| | | |
|---|---|---|
| CN | 1765613 A | 5/2006 |
| CN | 101529147 A | 9/2009 |
| EP | 2141405 A1 | 1/2010 |
| JP | 60109686 A | 6/1985 |
| JP | H04314525 A | 11/1992 |
| WO | 8703840 A1 | 7/1987 |
| WO | 9821444 A2 | 5/1998 |

\* cited by examiner

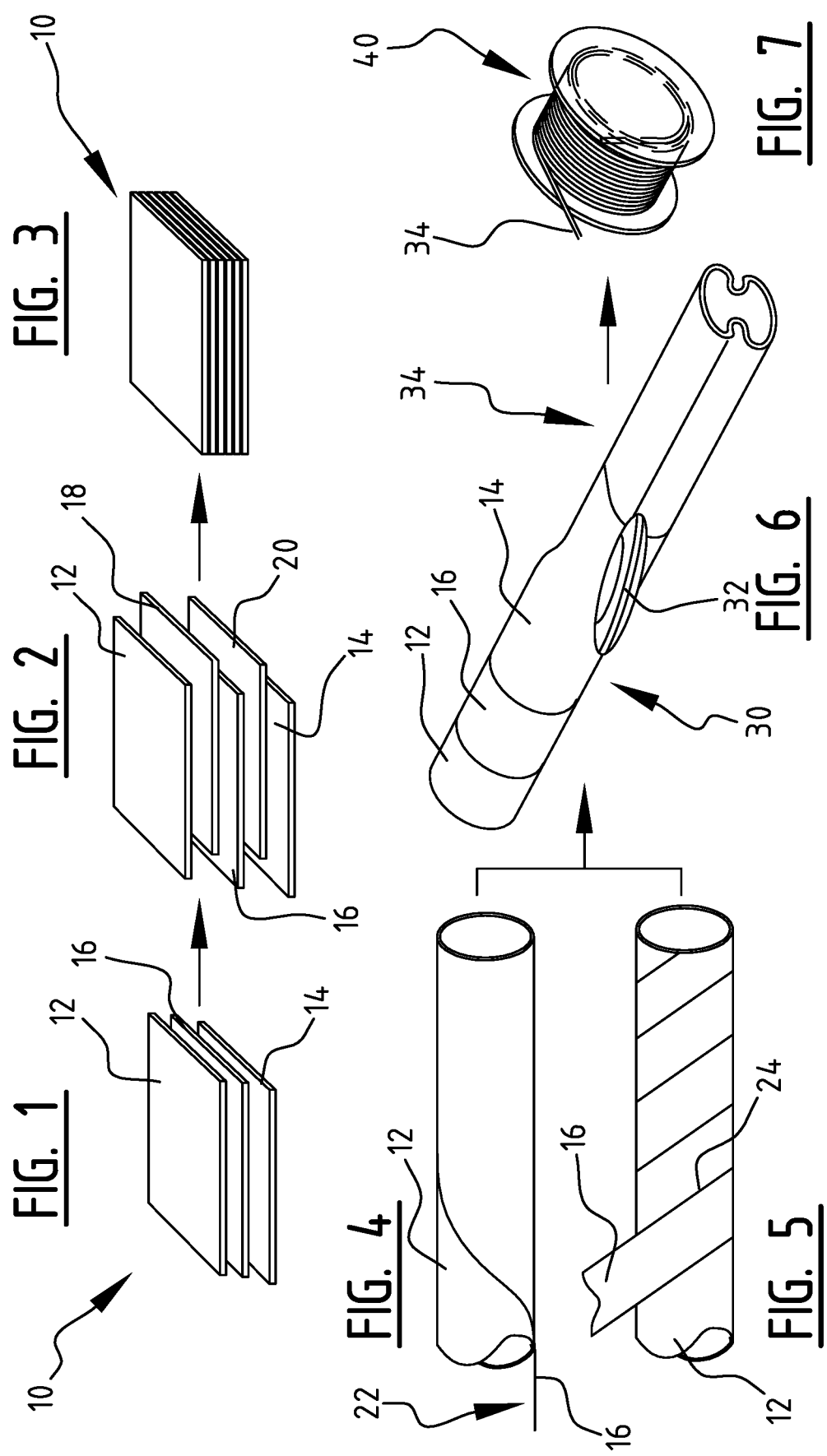

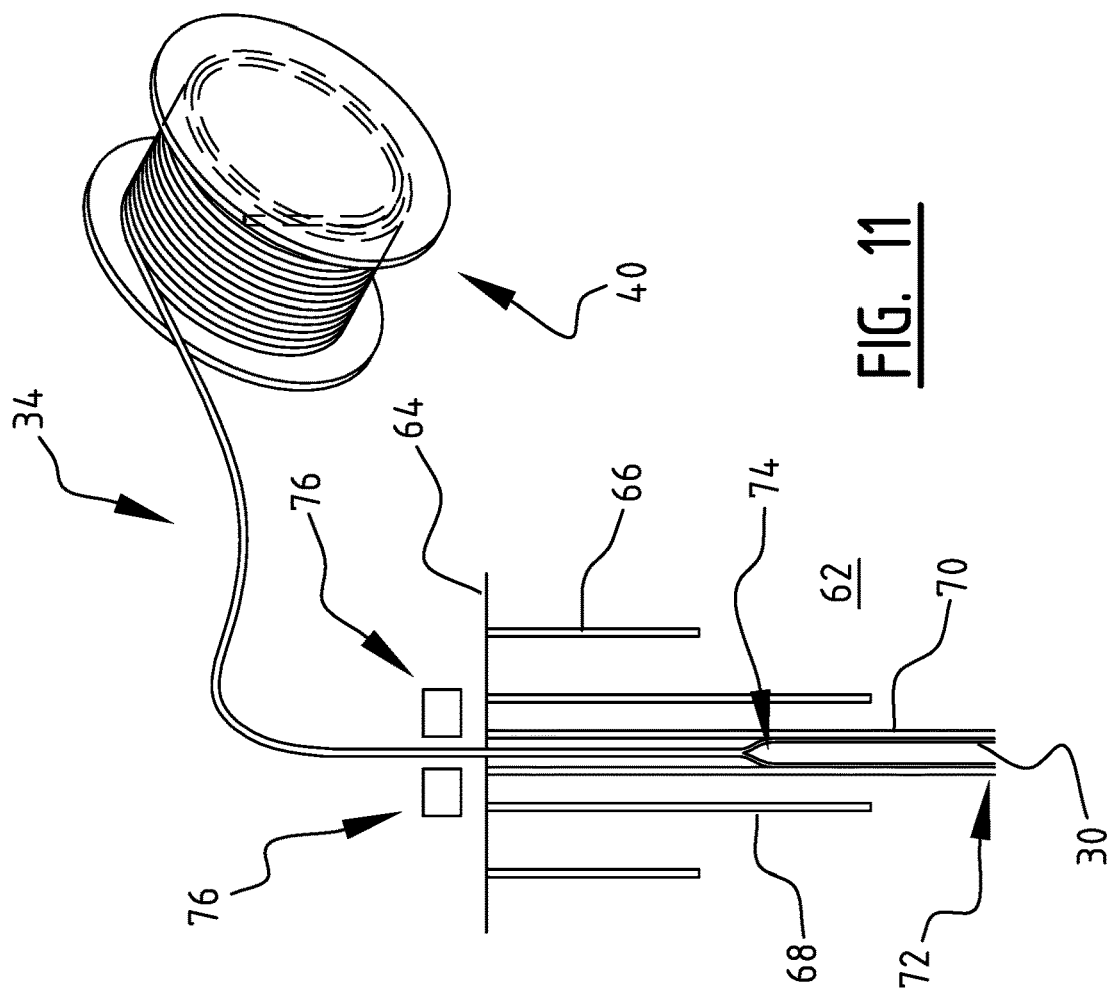
FIG. 11
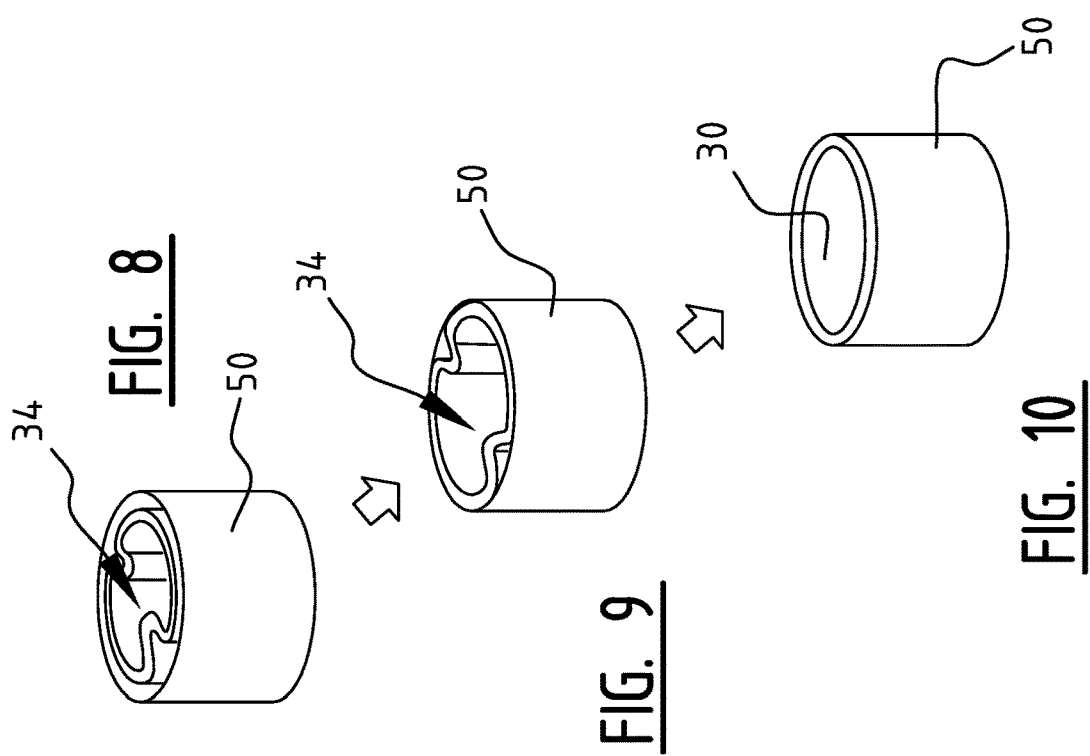
FIG. 8
FIG. 9
FIG. 10

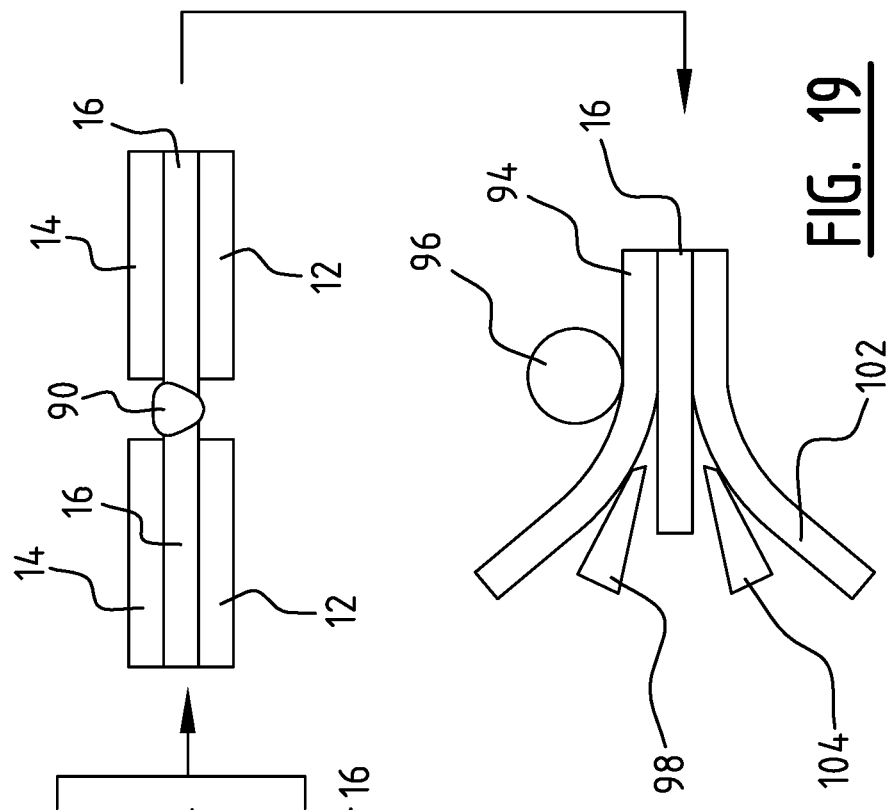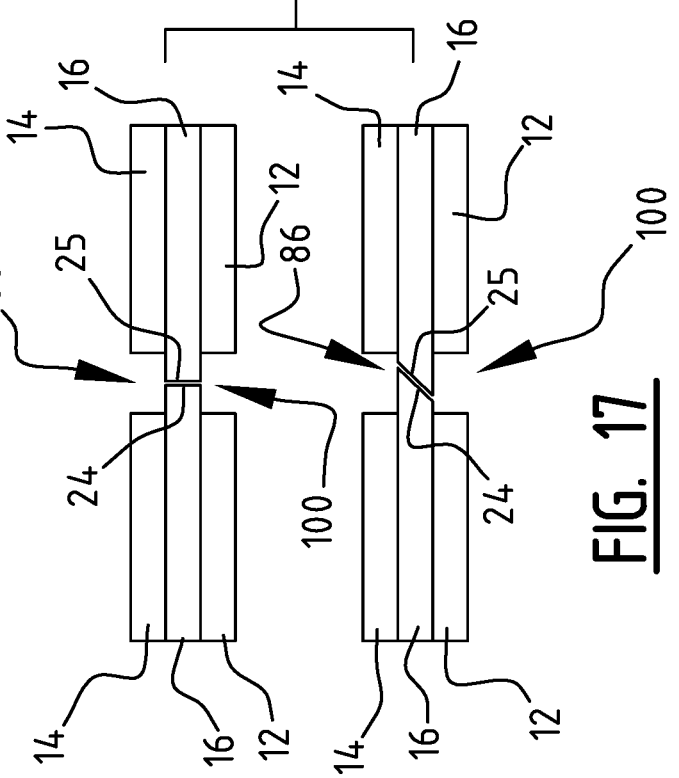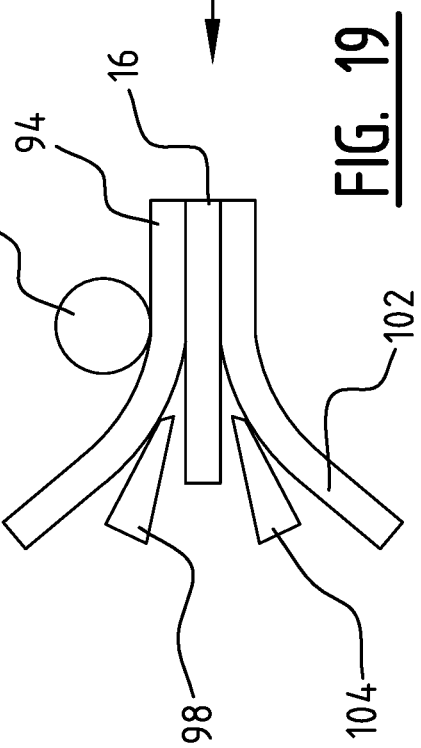

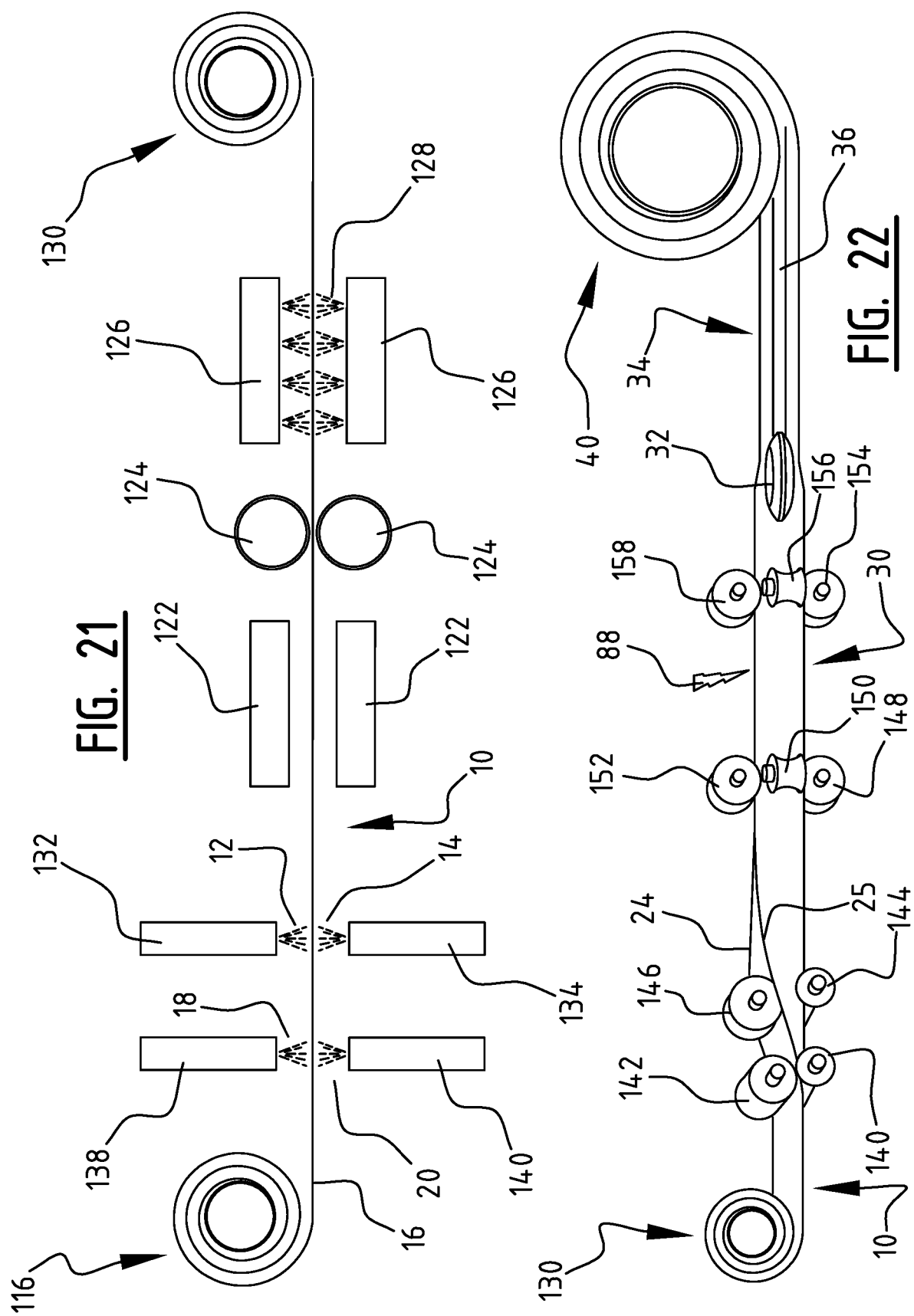

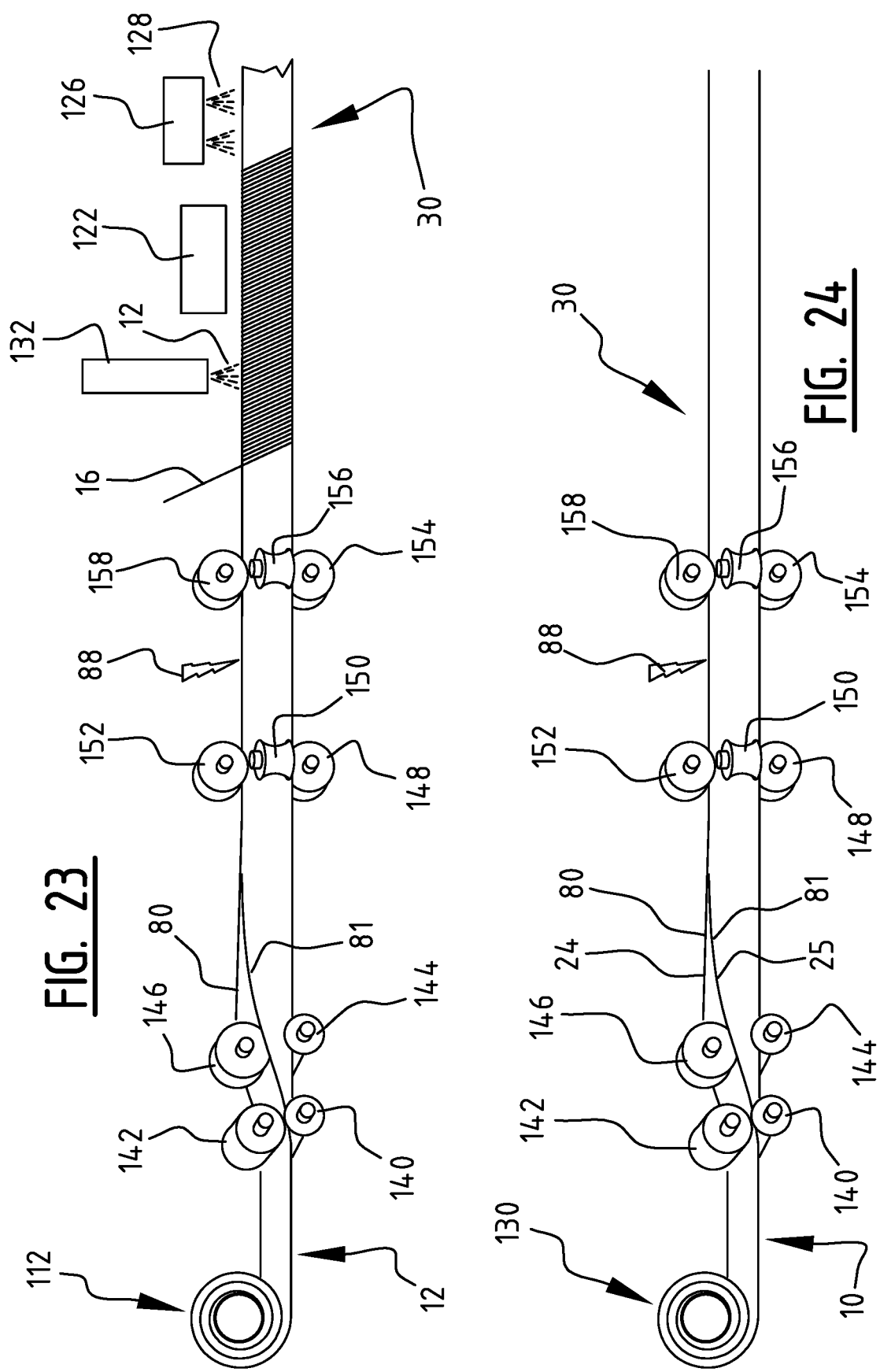

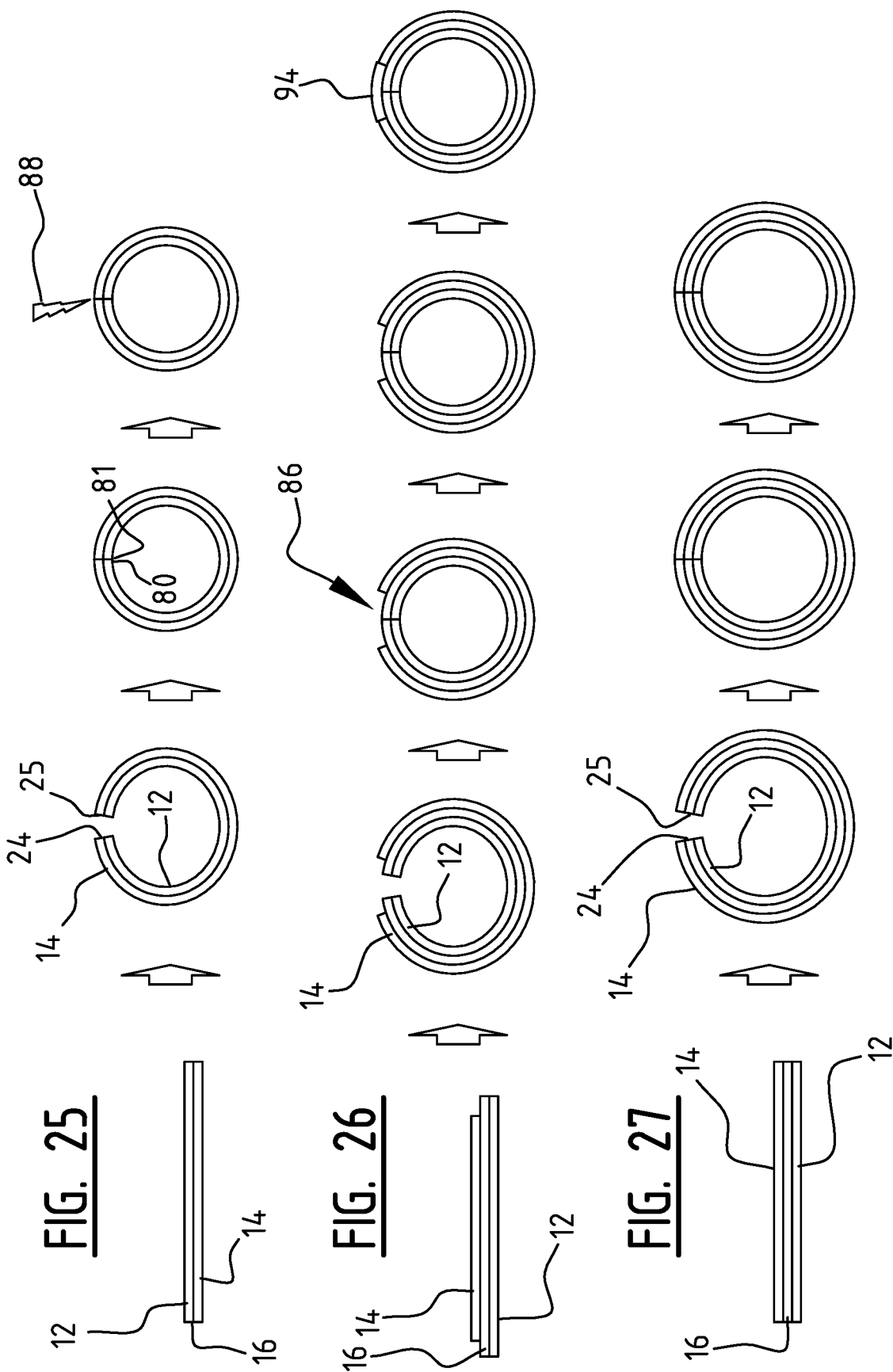

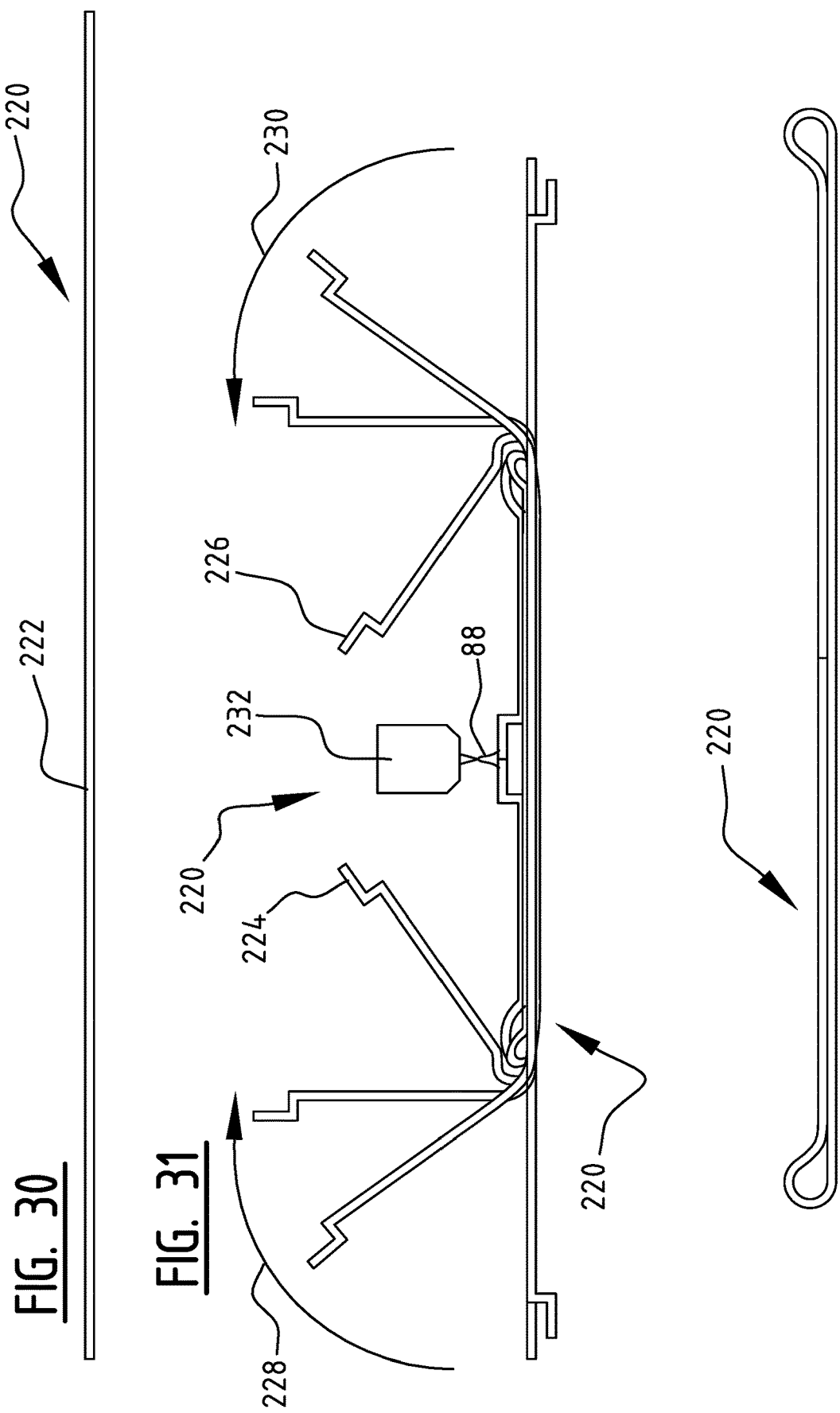

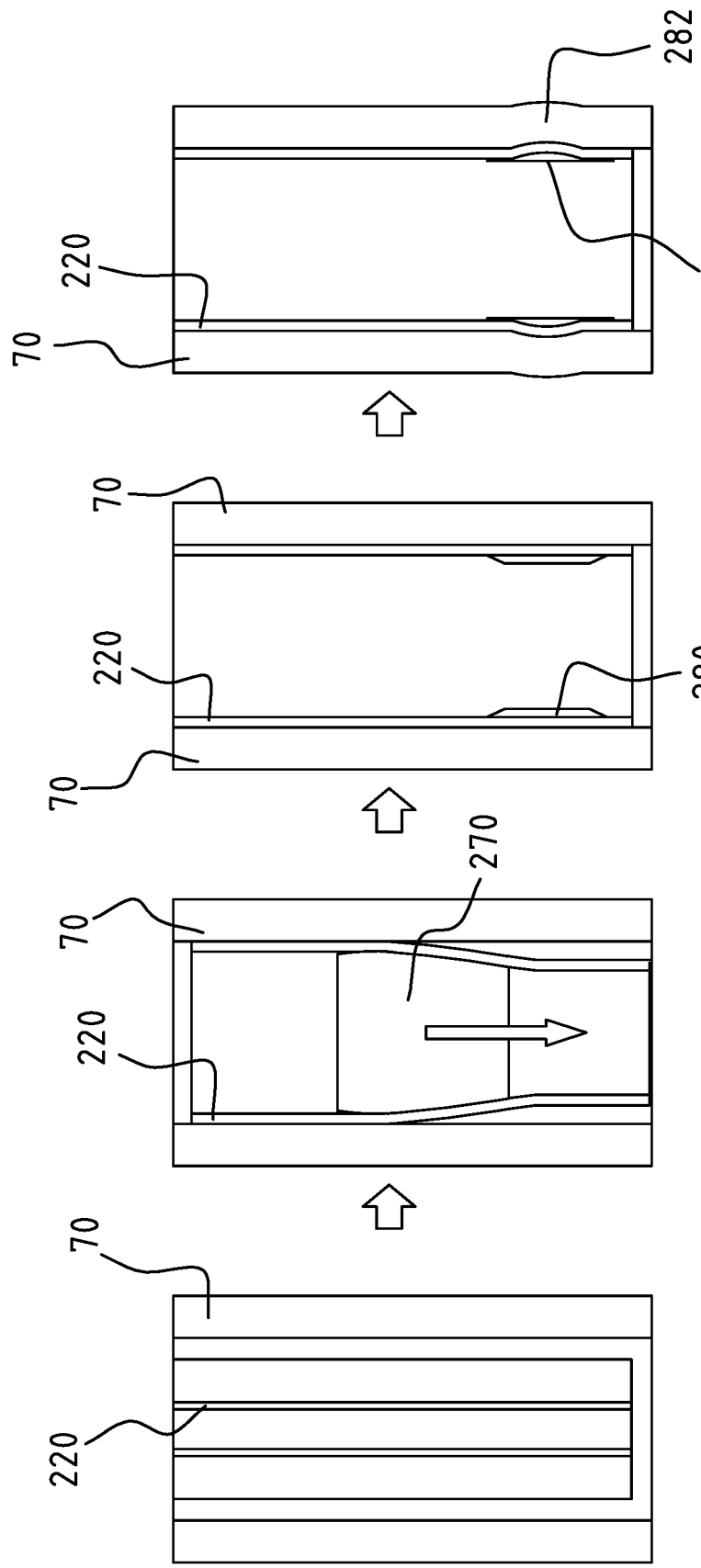

METHOD AND SYSTEM FOR LINING A TUBULAR

CROSS-REFERENCE TO RELATED APPLICATIONS

The present application is a continuation of U.S. patent application Ser. No. 15/121,468, filed on Aug. 25, 2016, which is a National Stage (§ 371) of International Application No. PCT/EP2015/054115, filed Feb. 27, 2015, which claims priority from European Application No. 14157013.5, filed Feb. 27, 2014, the disclosures of each of which are hereby incorporated by reference in their entirety.

BACKGROUND OF THE INVENTION

The invention relates to method and system for internally lining a tubing string to protect the tubing string against corrosion and/or leakage.

Wellbores for the exploration and production of oil, gas or other minerals from subterranean reservoir layers are typically provided with protective tubing, casing and/or other liner strings. These may include a pipe string lowered into an openhole section of the wellbore and cemented in place. Herein, the term casing is typically used to indicate a pipe string extending from surface into the wellbore, whereas liner may typically be used to indicate a pipe string which extends from a downhole location further down the wellbore. Hereinafter, the term casing will be primarily used, but the invention is equally applicable to liner.

The casing or liner strings may be designed to withstand a variety of forces, such as collapse, burst, and tensile failure, as well as chemically aggressive brines. The casing string is typically assembled from multiple interconnected pipe sections, having a length of for instance about 10 metres each. Casing connections connect adjacent pipe sections. The casing sections may be fabricated with male threads on each end, wherein shorter-length casing couplings with female threads are used to join the individual sections of casing together. Alternatively, pipe sections may be fabricated with male threads on one end and female threads on the other.

Casing may be run to protect fresh water formations, isolate a zone of lost returns or isolate formation layers with significantly different pressure gradients. The operation during which the casing is put into the wellbore is commonly called "running pipe."

Inside the innermost casing, a wellbore may typically be provided with another tubing string, typically referred to as production string or production tubing. Herein, the production tubing may be assembled with other completion components to make up the production string. The production string is the primary conduit through which reservoir fluids are produced to surface. The production string is typically assembled with tubing and completion components in a configuration that suits the wellbore conditions and the production method. The tubing itself may be made up from interconnected pipe sections, in a similar fashion to the casing strings. An important function of the production string is to protect the primary wellbore tubulars, including the casing and liner, from corrosion or erosion by the reservoir fluid.

Interior surfaces of the production tubing and their associated connections are frequently subjected to one or more of relatively high temperatures, high pressures and highly corrosive fluids. Temperatures may range up to 175° C. or more. Pressures may be as high as 1400 bars or more. The reservoir fluids may be highly corrosive, for instance due to the combination of hydrocarbons, $CO_2$ and/or $H_2S$ in the presence of water. The use of secondary and tertiary enhanced recovery methods in hydrocarbon production, such as gas injection, water flooding and chemical flooding, may further aggravate the situation.

Pipe sections for wellbore tubulars, including the casing or production tubular, are usually manufactured from plain carbon steel with varying compositions that is heat-treated to varying strengths. Alternatively, pipe sections may be specially fabricated of stainless steel, nickel alloys, aluminum, titanium, fiberglass and other materials.

Materials have different resistance to corrosion. Carbon steel for instance is relatively inexpensive, but also more prone to corrosion than the other materials listed above.

Several types of corrosion mechanisms exist, including: erosion-corrosion (also known as impingement), stress corrosion cracking, sulphide stress cracking, pitting, and galvanic corrosion.

Corrosion in metals may be caused by the flow of electricity from one metal to another metal or from one part of the surface of one piece of metal to another part of the same metal where conditions permit the flow of electricity. Further, a moist conductor or electrolyte must be present for this flow of energy to take place. Energy passes from a negative region to a positive region via the electrolyte media.

Electrical contact or coupling of dissimilar metals frequently causes increased corrosion. This form of corrosion is generally referred to as galvanic corrosion. Galvanic corrosion is quite prevalent and troublesome, occurring in a wide variety of circumstances. For example, coupling aluminum and iron pipe together will result in very rapid corrosion of the aluminum pipe section. The galvanic corrosion mechanism may be illustrated by considering the effect of electrically connecting zinc to platinum immersed in sea water. Under these conditions, the platinum is inert and does not corrode, while the zinc is attacked. The reactions occurring on the surface of the zinc are the anodic oxidation of zinc to zinc ions, and the cathodic reduction of dissolved oxygen to hydroxide ions. If the electrical potentials of these two metals are measured, the platinum would be found to have a positive potential, while the zinc would be found to have a negative potential. As may be appreciated, as the potential difference increases, galvanic corrosion increases.

Obviously, from a corrosion standpoint, the replacement of steel tubulars and associated hardware with materials less subject to corrosion would be highly desirable in gas and oil applications, if it were practical or economically viable. Non-metallic components, such as fiberglass casing, tubing, sucker rods and the like are finding their way into oil field applications. Performance limitations, including service loads, pressures and temperatures, restrict the across-the-board replacement of metallic hardware, however. On the other hand, pipe sections made of solid corrosion resistant alloy (CRA), such as stainless steel and nickel alloy, may provide sufficient corrosion resistance. But tubular sections made of solid corrosion resistant alloys are typically much more expensive than carbon steel. The latter may render projects uneconomical. In addition, newly developed hydrocarbon reservoirs are producing increasingly corrosive hydrocarbons, for instance including a greater percentage of $H_2S$, requiring higher grade Corrosion Resistant Alloys (CRAs). And higher grade CRAs are increasingly more expensive. For instance, compared to API grade P110 carbon steel, the same pipe section made of CRA may be up to 5, 10 or even 25 times more expensive (when made of 316L, SM25CRW-110/125, or C22 CRA respectively).

Several manufacturing methods have been developed for producing corrosion resistant clad or lined carbon steel tubular, for instance for transporting oil and gas, to achieve economic advantages over solid corrosion resistant alloy (CRA) tubular such as stainless steel and nickel alloy. However, the use of these clad or lined tubulars has not gained acceptance for downhole tubular primarily due to the lack of a thread connection that has demonstrated adequate corrosion resistance performance.

To guard against galvanic corrosion, insulating coatings may be applied. In order for a coating to be used on tubular sections and threaded couplings to protect the metal substrate from corrosion, the coating must be resistant to attack and maintain its adherence to the metal substrate under the harsh downhole conditions referred to above.

In various oil and gas applications, steel pipe is provided with a lining of corrosion-resistant material. For example, it is known to bond various epoxy-based coatings to the interior of the pipe, as well as coatings containing polyethylene, polyvinyl chloride and other thermoplastic and thermosetting materials.

Of the various polymeric coating materials, arylene sulfide polymers have gained wide acceptance, see for instance U.S. Pat. No. 3,354,129. Generally, these polymers consist of a recurring aromatic structure coupled in repeating units through a sulfur atom. Commercially available arylene sulfide polymers which have been used for coating oil and gas pipes and pipe couplings are polyphenylene sulfides. The polyphenylene sulfides used in oil and gas applications exhibit high melting points, outstanding chemical resistance, thermal stability and are non-flammable. They are also characterized by high stiffness and good retention of mechanical properties at elevated temperatures as well as the ability to deform smoothly, thereby, for example, preventing the galling of threads, even at high thicknesses.

U.S. Pat. No. 3,744,530 describes polyphenylene sulfide coated pipes, wherein the polyphenylene sulfide coating also contains a filler, such as iron oxide, in an amount of between 5% to 30%.

While polymeric coated pipes and couplings have gained wide acceptance in applications requiring corrosion protection, the cracking of such coatings during installation and in use tends to limit their insulating effect, increasing the likelihood that galvanic corrosion will take place. This is particularly relevant in the female part or pin-end of the connections, where cracking may occur during assembly of the connection. Moreover, the polymeric coatings of threaded couplings are particularly prone to cracking due to the stresses imparted during assembly of connections. In addition to cracking, many polymers allow diffusion of hydrogen and other light hydrocarbons through the thickness of the coating or liner, thereby allowing gas to accumulate between layers, which, in the case of a corrosion resistant liner could result in collapse if the pressures in the bore and annulus become unbalanced.

JP 60 109686 A (KAWASAKI HEAVY IND LTD) 15 Jun. 1985 (1985 Jun. 15) provides a pipe system for transport of corrosive fluids. The pipe system comprises a tubular member made of a corrosion prone metal. Each tubular member is provided with an inner lining of a corrosion resistant material. At each end, the tubular member and the inner lining are connected to a threaded coupling member, which is made of a corrosion resistant material. The tubular member and the liner are connected to the threaded coupling member by a weld seam. But the welding of solid CRA couplings to a carbon steel pipe body, or the welding related method, can cause issues in itself. See for instance the description of galvanic corrosion above. In addition, the cost saving from using clad steel rather than solid CRA is particularly valid when the total wall thickness of the pipe increases. When the product of outer diameter (OD) times wall thickness (T) decreases however, the cost benefit of corrosion resistant alloy clad pipe versus solid CRA pipe decreases rapidly. For instance, for pipe clad with Incoloy 825, the cost benefit is reduced to nil for tubulars having smaller OD×T. The latter however are typically used for production tubing.

While the use of corrosion resistant alloys for corrosion control has demonstrated superior corrosion resistance properties, they are quite costly and exhibit complex manufacturing and handling constraints. The price of high-performance steel, such as 18-8 stainless steel, may be about 5 times as expensive as carbon steel. Nickel alloys for instance, which may also include high percentages of chromium (e.g. more than 10%) and/or molybdenum, may exceed the price of carbon steel with a factor of about 20 to 30. Nickel alloys, however, are often the material of choice in environments containing relatively large volumes of $H_2S$. For instance, when the $H_2S$ partial pressure exceeds 5 to 10 bars, nickel alloys may be required.

In oilfield applications, polymeric coatings will be unsuitable when the partial pressures of either $CO_2$, $H_2S$ and/or water exceed a certain threshold, as these materials may permeate through the polymeric coating, which may lead to corrosion of the carbon steel base material. Also, the temperature range wherein polymeric coatings can be applied is typically limited to a maximum of about 100 to 150 degree C.

US-2007/0095532 discloses an apparatus to deploy a patch comprising an inner metal tube and an outer resilient sealing member. Suitably, the inner metal tube is formed from steel, preferably, carbon steel. The outer resilient sealing member is formed from an elastomeric material. Suitably, the patch may be from 10 to 1000 feet in length.

As a disadvantage, in the disclosure of US-2007/0095532, the length of the liner patch is inherently limited by the apparatus described. The liner patch is clamped by extending and retracting slips attached to the apparatus, so the weight of the liner patch is carried by the friction these slips exert on the liner. The force applied by these slips determines the frictional force. The extending and retracting slips will have insufficient capacity to support liner exceeding a certain length, such as several kilometres. Furthermore, in the case of a very thin liner, the pressure that the slips can exert before deforming the liner is minimal, minimizing the friction force also. Although a thin liner is lighter than a thicker patch, the weight of the liner is still typically in the order of 1.3 kg/m. This would provide a total weight of several thousand kilograms if one would consider lining the production tubing along the length of the wellbore.

As hydrocarbon wellbores extend to ever greater target depths, for instance in the range of five to ten kilometres or even more, the apparatus of US-2007/0095532 would be unsuitable to provide a liner patch to the entire inner surface of the production tubing.

Furthermore, the apparatus of US-2007/0095532 is supported by a wireline which, in the configuration as disclosed, would have to travel through the liner. For longer lengths, the practicalities of threading several kilometres of wireline through the liner patch, while still supporting the weight of the liner by the wire line while running into the well, are unrealistic. This is supported by the exemplary length of liner patch as disclosed in US-2007/0095532, which is limited to 1000 feet (about 300 metres).

US-2010/0247794-A1 wellbore tubing lining method wherein a polymer layer is cured downhole actinic radiation. The liner is introduced in the borehole via an apparatus attached to a wireline, which would than expand the liner via a vessel or bladder on a wire line. The bladder will inflate along the full length of the liner to expand the liner. The system is limited to the delivering of a polymer liner. Also, the system can only be applied for limited lengths. The fabrication of a bladder or vessel to expand the liner will inherently limit the length of the liner to be expanded. Providing a bladder which extends along the entire length of the production tubing will be impossible. Moreover, the necessity to run such a vessel into the hole will further limit the maximum length thereof.

U.S. Pat. No. 3,785,193 discloses a liner expanding apparatus and a method including lowering and affixing a liner by means of wireline. The liner is crimped onto an expansion tool and hangs down from it. This configuration has similar limitations to patent documents US-2007/0095532 and US-2010/0247794-A1 described above, in that the clamping of the liner is based on friction. The friction is insufficient for longer lengths of liner, particularly for thinner liner, given the limited frictional force which can be generated. Also, given that the apparatus is suspended from a wireline, running in the liner will prove impossible above a certain threshold length of liner, due to problems at the surface. As a result, the system of U.S. Pat. No. 3,785,193 is unsuitable to line production tubing along its entire length, which may be in the order of several kilometres.

Other methods and system for expanding a liner within a surrounding tubular string are disclosed in International patent application WO 98/21444 and US patent applications US 2006/052936, US2007/095532 and US 2010/247794.

A general problem with the known tubing lining systems and methods is that pockets of fluids may be trapped between the liner and tubing, which may result in detachment of the liner from the inner wall of the tubing and collapse of the liner.

There is a need for an improved method and system to protect tubulars against corrosion and leakage by use of a tubing liner assembly that automatically removes fluid from the residual space between the liner and tubing, thereby inhibiting formation of fluid pockets and/or longitudinal leakage paths between the liner and tubing and reducing the risk of detachment of the liner from the inner surface of the tubing and the associated risk of subsequent collapse of the liner.

SUMMARY OF THE INVENTION

The present invention therefore provides a method for lining a tubing string, comprising;
  inserting a folded liner having an outer surface which is at least partially coated with a fluid absorbing coating into the tubing string;
  unfolding the liner to expand the liner against an inner surface of the tubing string; and
  inducing the coating to absorb fluid trapped between an inner surface of the tubing string and an outer surface of the expanded liner.

The coating may comprise bonding and liquid absorbing additives, such as a sticky glue and a hygroscopic material, such as silica gel and/or a cross-linked acrylate polymer described in U.S. Pat. No. 7,144,980, which is generally known as a Super Absorbent Polymer (SAP) or hydrogel, which absorbs any substantial pockets of water and/or other fluid trapped, and thereby enhances the bond, between the tubing string and the expanded liner.

In accordance with another aspect of the invention there is provided a system for lining a tubing string in a wellbore, comprising a liner, which is configured to be folded in a collapsed state into the tubing string and to be unfolded against an inner surface of the tubing string and which is at least partially coated with a fluid absorbing coating that is configured to absorb fluid trapped between the inner surface of the tubing string and the expanded liner.

The method and system according to the invention enable continuous cladding of a kilometres long oil and/or gas well tubing and/or casing string by a single thin foil corrosion resistant liner that may be coated with hygroscopic and sticky glue to enhance the bonding of the liner to, and inhibit corrosion and leakage of, the tubing and/or casing string.

These and other features, embodiments and advantages of the method and system according to the invention are described in the accompanying claims, abstract and the following detailed description of non-limiting embodiments depicted in the accompanying drawings, in which description reference numerals are used which refer to corresponding reference numerals that are depicted in the drawings.

Similar reference numerals in different figures denote the same or similar objects. Objects and other features depicted in the figures and/or described in this specification, abstract and/or claims may be combined in different ways by a person skilled in the art.

BRIEF DESCRIPTION OF THE DRAWINGS

The invention will be described hereinafter in more detail and by way of example with reference to the accompanying drawings, in which:
  FIG. 1 shows a perspective view of separate layers of a liner according to the invention;
  FIG. 2 shows a perspective view of separate layers of a liner according to the invention;
  FIG. 3 shows a perspective view of an embodiment of a liner of the invention;
  FIG. 4 shows a perspective view of an embodiment of a liner according to the present invention;
  FIG. 5 shows a perspective view of another embodiment of a liner according to the present invention;
  FIG. 6 shows a perspective view of a practical embodiment of the liner of the invention;
  FIG. 7 shows a perspective view of a reel comprising the liner according to the invention;
  FIG. 8 shows a perspective view of a cross section of a tubular, which in a first step is provided with a liner according to the invention;
  FIG. 9 shows a perspective view of a cross section of a tubular, which in a second step is provided with a liner according to the invention;
  FIG. 10 shows a perspective view of a cross section of a tubular, which in a third step is provided with a liner according to the invention;
  FIG. 11 shows a schematic cross section of a wellbore provided with a liner according to the invention;
  FIGS. 12 to 19 show exemplary steps of various embodiments to fabricate the composite material of the invention;
  FIGS. 20 and 21 show respective embodiments of methods to manufacture the composite liner of the invention;
  FIGS. 22 to 24 show perspective views of respective methods to manufacture a pipe using the composite liner;

FIGS. 25 to 27 show cross-sectional views of respective methods to manufacture a pipe using the composite liner;

FIGS. 30 to 32 show consecutive steps in an embodiment of a process to fabricate a liner of the invention;

FIGS. 36 to 39 show consecutive steps of an exemplary method for lining a wellbore tubular.

DETAILED DESCRIPTION OF DEPICTED EMBODIMENTS

Figure 12:
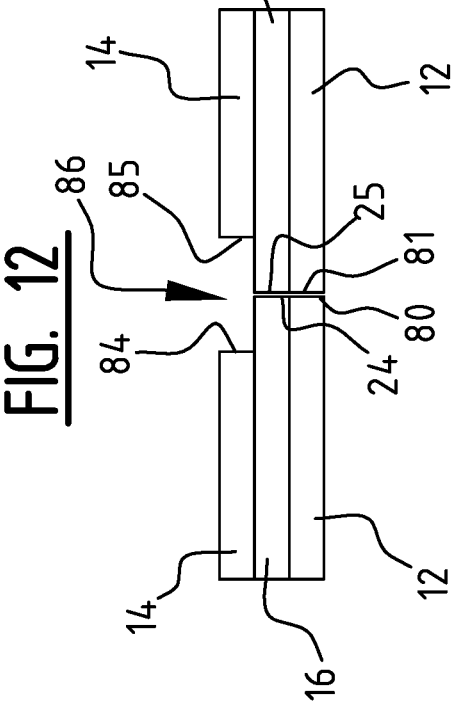
Figure 13:
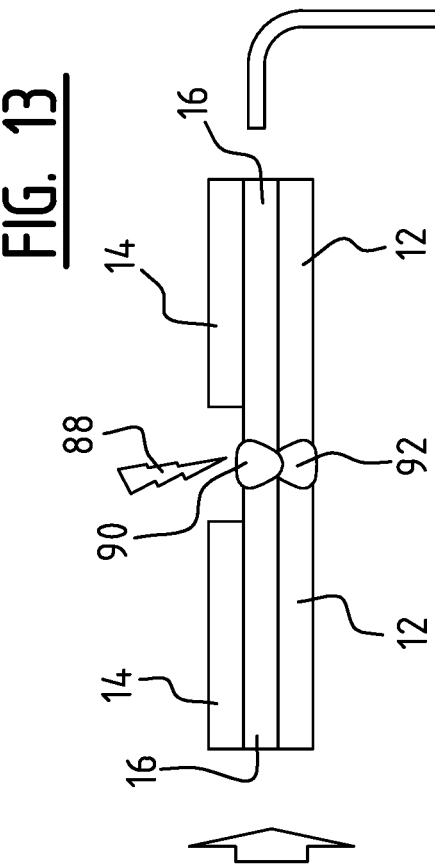

FIG. 1 shows an embodiment of a composite material 10 suitable for manufacturing a thin foil liner according to the present invention. The composite material comprises a first polymer layer 12, a second polymer layer 14 and an intermediate metallic layer 16. Optionally, as shown in FIG. 2, a first adhesive layer 18 may be arranged between the first polymer layer and the metallic layer. A second adhesive layer 20 may be arranged between the metallic layer and the second polymer layer.

Herein, the first and/or second polymer layer may be a layer consisting of a single polymer or may itself be a composite layer. Each polymer layer may in fact include steel, carbon, or glass fibre wire and/or particles of a relatively hard material embedded in the polymer. Hard herein implies being harder or stronger than the polymer base material. The hard-particulate material may serve for abrasion protection on the inner diameter of the composite liner of the invention.

The respective layers of the composite material are bonded to each adjacent layer, forming a layer of assembled composite material 10 as shown in FIG. 3. The assembled composite material may have any desirable form, such as a longitudinal strip.

FIGS. 4 and 5 show different examples of a method to form the composite material into a tubular shape. FIG. 4 shows the first polymer layer 12 formed into a tubular shape. The metal layer 16 is provided in the form of a longitudinal strip 22 and bend around the tubular first polymer layer 12. After bending, the sides 24 of the metal layer 16, which extend in axial direction, are connected to each, for instance by welding. In another embodiment, shown in FIG. 5, the metallic layer 16 is provided in the form of longitudinal strip 22. Said strip 22 is helically wound around the tubular first polymer layer 12. The sides 24 of the strip 22 may be connected to each other, for instance by welding. Alternatively, the metallic layer may be glued to the polymer layer. The second polymer layer 14 is applied in a similar fashion, providing a longitudinal tube 30 made of the composite material 10, see FIG. 6.

In an embodiment shown in FIG. 6, tool 32 may be used to model the longitudinal tube 30 of composite material in a collapsed tubular 34, having a reduced outer diameter. Herein, the tool 32 may have created one, two or more longitudinal folds 36 extending in axial direction. Said collapsed composite tube may have any suitable length and can be arranged on a reel 40, see FIG. 7. Alternatively, the composite material, or components thereof, may be manufactures as a collapsed tubular, rather than in the round shape and subsequently folded.

The collapsed tube 34 may be used to line a pipe 50. In a first step (FIG. 8), the collapsed tube 34 is arranged within the pipe 50. In a second step (FIG. 9), the collapsed tube 34 is expanded, to a tubular form 30 (FIG. 10).

In a typical oilfield application (FIG. 11), a wellbore 60 may be provided extending into a formation 62 below ground level 64. The wellbore is typically provided with one or more tubular casings or liners, such as conductor pipe 66, intermediate casing 68 and production tubing 70. Herein, the production tubing is typically included in a production casing, which is not shown however to improve clarity. Produced hydrocarbons will be transported to surface via the inside of the production tubing 70. Consequently, the inner surface of the production tubing 70 may be exposed to varying quantities of $CO_2$ and $H_2S$ in the presence of water, all of which may be transported to surface together with the hydrocarbons.

In an embodiment, the collapsed tube 34 is unreeled and inserted though the production tubing. Preferably, the tube 34 herein extends all the way to the downhole end 72 of the production tubing above a Side Sliding Door (SSD) and/or a Side Pocket Mandrel (SPM) to be able to cover at least a substantial part of the entire length thereof.

The collapsed tube 34 can for instance be inserted into the wellbore by connecting a weight to the downhole end thereof and lowering said weight in the wellbore until it reaches the bottom. Alternatively, the collapsed tube can be inserted in the wellbore by applying pressure, or by running it in as part of, or in fact around, a Coiled Tubing string or other type of running string. The running string can be arranged either inside the collapsed composite tube 34, or even on the outside thereof.

Subsequently, the collapsed tube 34 is expanded to its expanded state. Herein, the expanded tube 30 preferably has an outer diameter corresponding to or slightly larger than the inner diameter of the tubing 70, so that the outer surface of the expanded tube engages the inner surface of the tubing 70.

A problem with conventional cladding concepts is the continuity of the cladding layer, especially at the locations of the connections between respective tubular sections. The composite liner of the invention can be made in a factory and consequently the continuity can be thoroughly inspected on surface before installation in the wellbore. To maintain the integrity of the composite liner during insertion in the wellbore, the outer diameter of the composite liner may be provided with protection means to protect against damage during running, installation or bonding to the inner surface of the wellbore tubing. Said protection means may include wires comprising a relatively damage resistant material arranged on the outer diameter of the composite liner. The damage resistant material may include one or more of steel, carbon, or glass fibre wires.

The collapsed tube 34 can be expanded in a number of ways. In a first embodiment, the tube 34 can for instance be inflated with a pressurized fluid in its interior. In this case, the downhole end of the tube 34 is closed before inserting it in the wellbore. After insertion, the surface end is cut off, whereafter the pressurized fluid is introduced to inflate and expand the liner. In a second embodiment, an expander cone 74, having a largest outer diameter which is substantially similar to the inner diameter of the tubing 70, can be pushed or pulled through the collapsed tube 34 to expand it. The expander can be moved from surface towards the downhole end 72 by pumping a pressurized fluid to push the expander. Subsequently, while the tube is maintained in position by the weight mentioned above, an expander cone 74 can be pulled to surface to expand the tube 34. Herein, a string, such as a coiled tubing string or a wireline, may have been integrated within the composite tube 30 during manufacturing thereof (not shown). The expander 74 may be attached to an end of said string or wireline before inserting the composite liner in the wellbore. Subsequently, the expander may, for instance in a collapsed form, be lowered in the wellbore together with the liner. When the composite liner is in the correct position, the expander cone may be transferred to its expanded form and pulled to surface using said string or wireline. Alternatively, the expander can be propelled to surface using hydraulic pressure generated by reverse circulating the well.

The expanded composite liner 30 may stick to the inner surface of the tubing 70 by various means. For instance, the outer surface of the composite liner may have been provided with an adhesive layer. Said adhesive layer may be applied to the outer surface of the collapsed tubing 34 during insertion into the wellbore using an adhesive applicator device 76, which may include a spraying device or a roller for applying the adhesive. Said adhesive may include a heat activated adhesive, which can be activated by introducing heated fluid into the wellbore or even by the elevated temperature in the wellbore, which as mentioned before are frequently in excess of 175° C. Alternatively, an activator which will activate the adhesive can be injected in the drilling fluid.

As shown in FIG. 12, in a first step of an exemplary embodiment for fabricating the composite material of the invention, strips of the first polymer layer 12, the metallic layer 16 and the second polymer layer 14 are arranged on top of each other. Optionally, the adhesive layers 18, 20 are interposed as shown in FIG. 2. The assembly of the stacked strips is folded in a tubular form along the length thereof, as shown in FIG. 4, until the opposite longitudinal sides 24, 25 of the metallic layer 16 and the opposite longitudinal sides 80, 81 of the first polymer layer engage each other and are aligned. Herein, opposite longitudinal sides 84, 85 of the second polymer layer leave a longitudinal opening 86 in between them, exposing the abutting sides 24, 25 of the metallic layer. The opening 86 may for instance expose about 1 to 20 mm, for instance about 10 mm, of the metallic strip on each side of said abutting sides 24, 25.

In a next step, the sides 24, 25 of the metal layer 16 will be joined by welding (schematically indicated by flash 88), for instance using arc welding or laser welding or a combination of these two welding techniques, producing weld 90. The first polymer layer 12 may be heated simultaneously to a temperature exceeding the melting point of the respective polymer material by the heat produced while welding the metal layer, leading to polymer weld 92. To ensure the structural integrity of the welds 90, 92, mechanical force may be applied to ensure both sides 24, 25 are engaged during the welding process.

Figure 14:
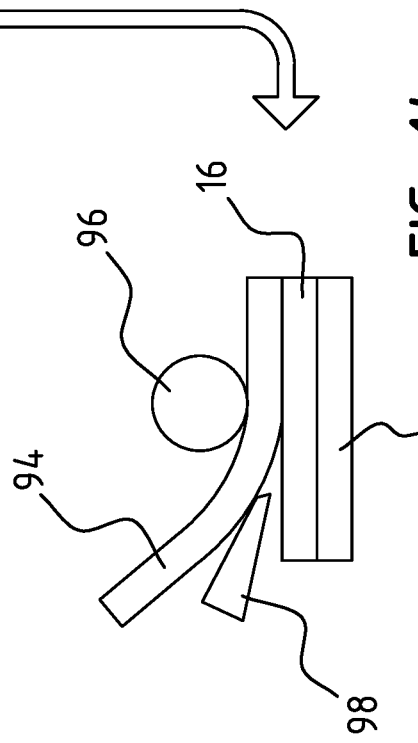
Figure 15:
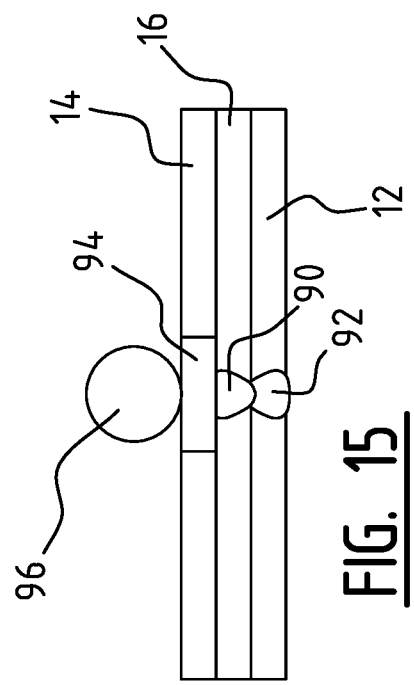

As shown in FIG. 14, to fill the blank area 86 on the upper surface of the metal 16, an additional polymer strip 94 will be inserted in the opening 86, using a mechanical system. Said mechanical system may for instance include a roller 96. To connect the strip 94 to the second polymer layer 14 and/or the metallic layer 16, heat can be applied using a heat source 98 such as hot dry air, infrared, or microwave (FIG. 15).

In an alternative embodiment, sides 24, 25 of the metallic layer are engaged in a butt joining (FIG. 16) or lap joining (FIG. 17) fashion. Herein, openings 86, 100 exposes both the outside surface and the inside surface of said sides 24, 25 respectively, which are subsequently joined using welding techniques, such as the techniques mentioned above, creating weld 90 (FIG. 18).

In a subsequent step (FIG. 19), the openings 86, 100 are provided, for instance filled or spray coated, with polymer strips 94, 102 respectively, as described above. An attachment device 104, for instance a heat source, may ensure bonding of the strip 102 to the metallic layer 16.

Herein below, additional details of embodiments of the manufacturing process of the composite liner of the invention are described.

The liner may be fabricated as a composite strip, which can be made by the following processes:

a) A thin metal strip laminated with a polymer film or a reinforced polymer film, either on one side or on opposite sides;

b) A polymer coated thin metal strip;

c) Polymer coating followed by winding of reinforcement fiber or reinforcement fiber fabric;

d) A combination of a), b) and c).

The first and/or second polymer layers can be applied only one side in composite strip manufacturing process stage. The application of Polymer layer for the other side can be applied in following pipe manufacturing processes.

To improve the bonding between metal strip and polymer film, adhesives can be added.

The polymer film can fully or partially cover each side of the metal strip according to the joining method of both longitudinal sides of the metal strip to make a pipe.

Figure 20:
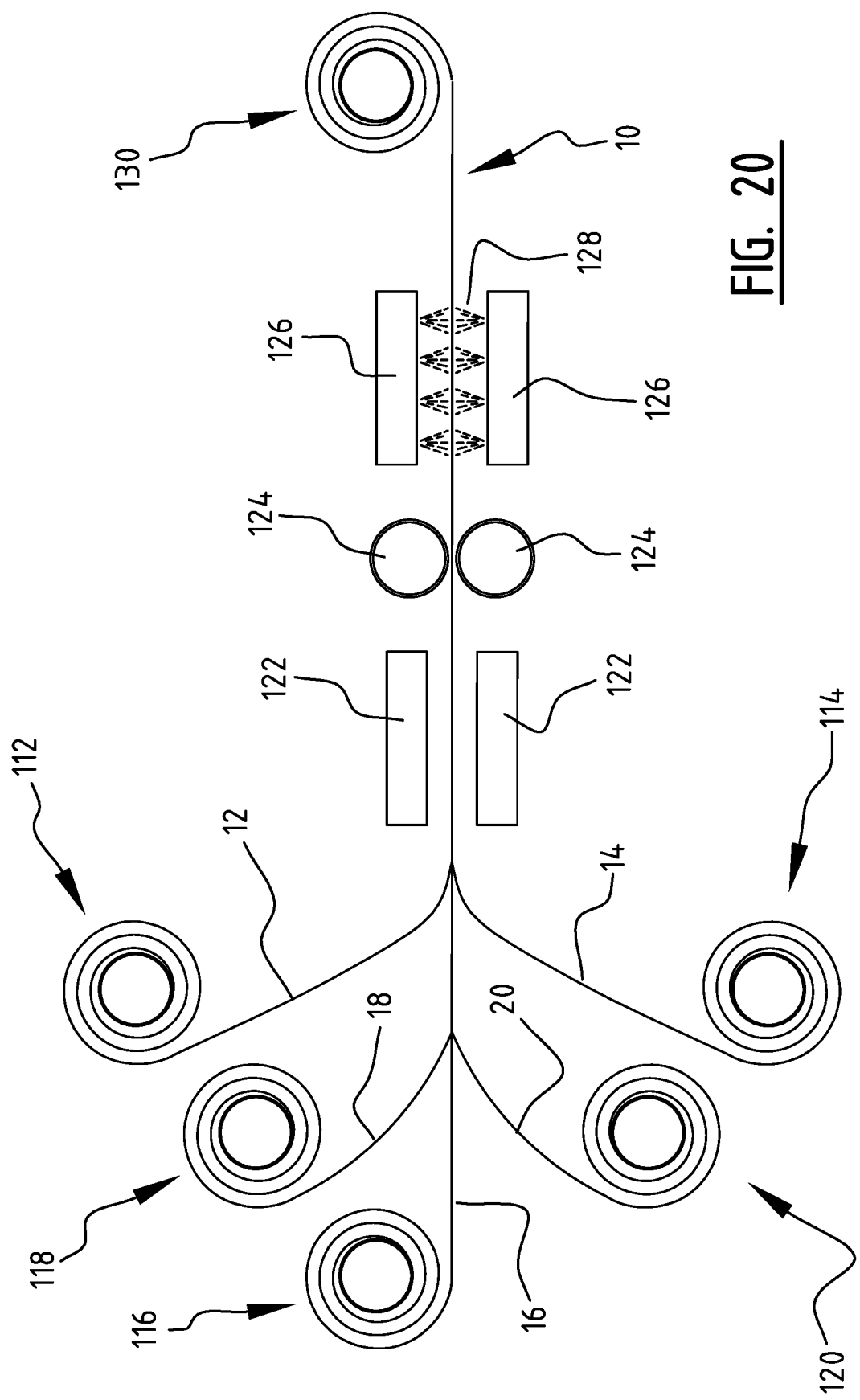

The composite strip can be made into a strip coil or continuously be connected to next step, pipe manufacturing process FIG. 20 shows first polymer film roll 112, second polymer film roll 114, metallic strip roll 116, and the optional first adhesive film roll 118 and second adhesive film roll 120. The respective films are unrolled and jointly transferred through heating device 122. The heating device 122 comprises for instance an induction heater, infrared (IR) heater elements, microwave heating elements, or ultraviolet (UV) heating elements. Subsequently, the films may be jointly led past compressive rollers 124, to improve bonding between the respective films. In a next step, the bonded films are cooled by cooling device 126, for instance by spraying a substance 128 such as compressed air or water. The bonded strip of composite liner is rolled onto composite liner roll 130.

FIG. 21 shows another embodiment, wherein metallic strip roll 116 is unrolled. Adhesive coating devices 138, 140 subsequently apply the first adhesive layer 18 and the second adhesive layer 20, for instance by spraying. In a next step, polymer coating devices 132, 134 apply the first polymer layer 12 and the second polymer layer 14, for instance by spraying. The assembled composite material 10 may subsequently be transferred through heating device 122, led past compressive rollers 124, and cooled by cooling device 126. The bonded strip of composite liner is rolled onto composite liner roll 130.

FIG. 22 shows an embodiment of a composite pipe manufacturing process. The composite liner roll 130 is unrolled. A strip of the composite liner material 10 is fed to a number of rollers 140-158, which continuously form, and bend said strip 10 in a tubular form 30, or maintain said tubular form. In between rollers 152 and 158, the opposite sides of the strip 10, indicated by sides 24, 25 of the metal layer 16, are bonded by welding, as indicated by flash 88. Tool 32 collapses the tube to a collapsed tubular 34, having a reduced outer diameter and longitudinal folds 36. The collapsed composite tube 34 is subsequently arranged on the reel 40.

In the embodiment of FIG. 23, the first polymer film roll 112 is unrolled, providing the first polymer film 12. The rollers 140-158 form and bend the first polymer film 12 in tubular form, and the opposite sides 80, 81 of said film are bonded, for instance by welding as indicated by flash 88. A strip of metallic layer 16 is applied, by helically winding said strip around the tubular first polymer layer 12. Thereafter, the second polymer layer 14 is applied by the polymer coating device 132. The assembled composite tube 30 is led past heating device 122 to improve bonding between the respective layers and past cooling device 126 for cooling. Subsequently, the composite tube 30 is collapsed and arranged on the reel 40 (not shown).

In the embodiment of FIG. 24, the roll 130 is unrolled, providing a strip of composite liner material 10. The rollers 140-158 bend said strip in tubular form. Herein, the opposite sides of the strip, including all its respective layers, are bonded by welding 88. Subsequently, the composite tube 30 is collapsed and arranged on the reel 40 (not shown).

In general, the strip of composite material 10 can make it through the following steps:
  a) Uncoiling into strip of composite material;
  b) Forming of said strip into tubular shape;
  c) Joining opposite sides of tubular shaped strip;
  d) Optionally, winding of a reinforcement fibre such as carbon fibre, glass fibre or reinforcement fibre fabric onto the outer surface of the composite tubular 30 and bonding it to the outer surface thereof;
  e) Corrugated forming of the composite pipe 30; and
  f) Coiling of pipe.

The above processes can be continuously progressed from a) to f), or batch processes can be divided into several sub-groups, for instance:
  Batch 1 process: from a) to d); and
  Batch 2 process: e) and f).

FIG. 25 shows the welding of opposite sides 24, 25 of the metal layer 16 by fusion welding. The first polymer layer 12 is heated to a temperature exceeding the melting temperature of the polymer by the heat of the fusion welding, so that its sides 80, 81 are simultaneously joined during welding of the metal layer.

FIG. 26 shows the bonding of the sides 24, 25 of the metal layer 16 by fusion welding. The first polymer layer 12 is heated to a temperature exceeding the melting temperature of the respective polymer by fusion welding heat, and its sides 80, 81 are simultaneously joined during welding of the metal layer. The uncovered part 86 of the outer surface of the metal layer 16 is covered by a coating of a polymer or by attaching of polymer film 94. Subsequently, the area covered by the polymer strip or coating 94 may be cooled followed by heating.

FIG. 27 shows the bonding of the sides 24, 25 of the metal layer 16 by laser welding. The polymer material of the second polymer layer 14 is transparent for the laser beam, and is not heated by the laser beam. During welding of the metal layer 16 by the laser, the sides of the inner and outer polymer layers are heated by heat transferred from the metal layer, and bond as a result.

In a practical embodiment, the composite material of the present invention comprises a single combination of polymer-metal-polymer layers. The composite material may have a total thickness in the range of about 150 µm to about 2 mm, typically about 1 mm or less. Each polymer layer in the polymer-metal-polymer composite material may be the same.

In an embodiment, the first and second polymer layers have a thickness in the range of about 50 µm to 500 µm. The polymer layers may comprise a base polymer selected from the group of thermoplastics such as PEEK (Polyetheretherketone), PI (polyimide), PPS (polyphenylene sulfide), PEI (poletherimide), PMMA (Polymethylmethachylate), PVDF (Polyvinylidene fluoride), PA (polyamide), PVC (Polyvinyl chloride), and PE (Polyethylene), and thermoset plastics such as expoxy, phenolic, melamine, unsaturated polyester, and polyurethane. Said base polymer may comprise a reinforcement, which may be a mixture of one or more of: short carbon fibre, PTFE, Graphite, nano oxide particle having a diameter below 20 nm. The blend may comprise additives to improve bonding with the reinforcement.

The metal layer may have a thickness in the range of 50 µm to 500 µm. The metal may comprise one or more of aluminum (Al) alloy, nickel (Ni) alloy, titanium (Ti) alloy, stainless steel. To improve the bonding with the polymer layers, if necessary, chemical treatment may be applied.

De-bonding is a major problem for conventional polymer clads in general. Well fluids may permeate into the polymer clad and expand when the well cycles to a lower pressure, thus pushing the clad away from the wall of the carbon steel base pipe. This problem is specifically prevented in the composite liner of the present invention, by including an impermeable metallic layer, preferably made of corrosion resistant alloy, between the wellbore fluids and the bonding agent on the outer diameter of our composite liner clad. Also, the de-bonding problem can be prevented on the inner diameter of the metallic layer, by making the polymer layer on that side (e.g. the first polymer layer) fully permeable, thus preventing pressure build-up.

Figure 28:
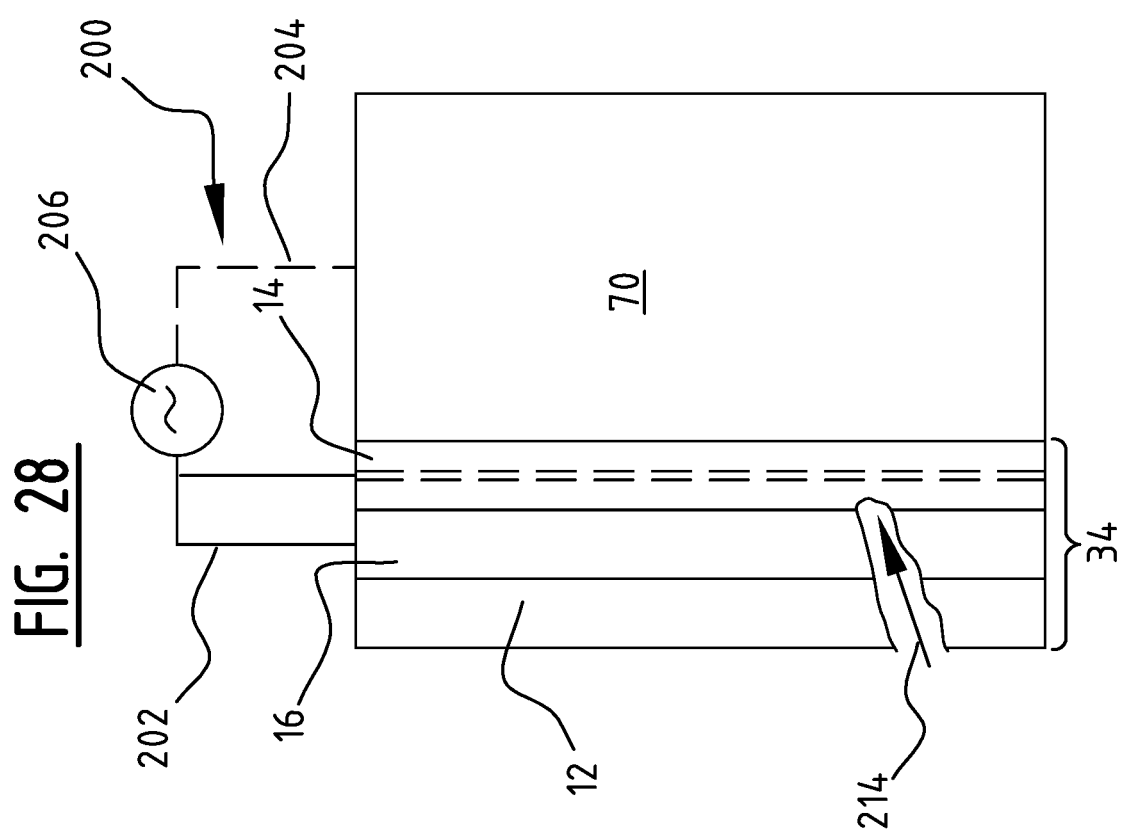
FIG. 28 shows a cross-section of an embodiment of a liner of the invention arranged on wellbore tubing.

As shown in FIG. 28, when the liner 34 is applied to the wellbore tubing 70, the metal layer 16 of the liner 34 may at surface be electrically connected to the tubing 70. Electrical circuit 200 may include electrical wires 202, 204 and electrical measurement device 206. The device 206 may be a volt meter, a current meter, or a resistivity meter.

Figure 29:
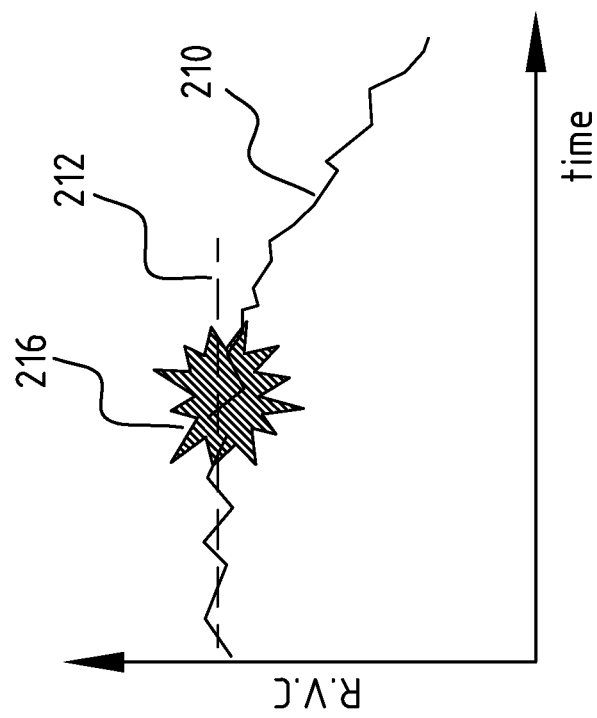
FIG. 29 shows an exemplary graph of a signal to monitor integrity of the liner.

FIG. 29 shows an exemplary output of the monitoring device 206 (y-axis) in time (x-axis). In a steady state, wherein the liner 34 is properly applied to the tubing 70, the output signal 210 of meter 206 will be within a predetermined bandwidth. An average value 212 of the signal will be substantially constant. If the liner 34 fails, an electrically conducting fluid 214, such as brine or water, may allow electrical contact between the metallic layer 16 of the liner and the wellbore tubing 70. Due to the electrical contact, indicated by event 216 in FIG. 29, the average value of the signal 210 will decrease, indicating liner failure to the wellbore staff at surface. In case of liner failure, the operation of applying a liner to the wellbore tubing may be repeated, providing a second layer of liner 34 to the inner surface of the tubing to restore corrosion resistivity.

In an alternative embodiment, a liner may be comprised of any suitable material. The material may be a composite material as described above, a single layer metallic material, a single layer polymer material, or any combination thereof.

The liner 220 may be provided as a sheet material 222 in a first step, shown in FIG. 30.

In a second step, shown in FIG. 31, opposite sides 224, 226 of the sheet material 222 may be bend upwards and toward each other, indicated by arrows 228 and 230. When the sides 224, 226 engage each other, they may be interconnected. Interconnecting may be done by welding, by welding device 232.

The resulting liner, shown in FIG. 32, may be flat. The liner 220 as shown in FIG. 32 can be reeled. The reel 130 may be ready for transport to a wellbore.

Figure 33:
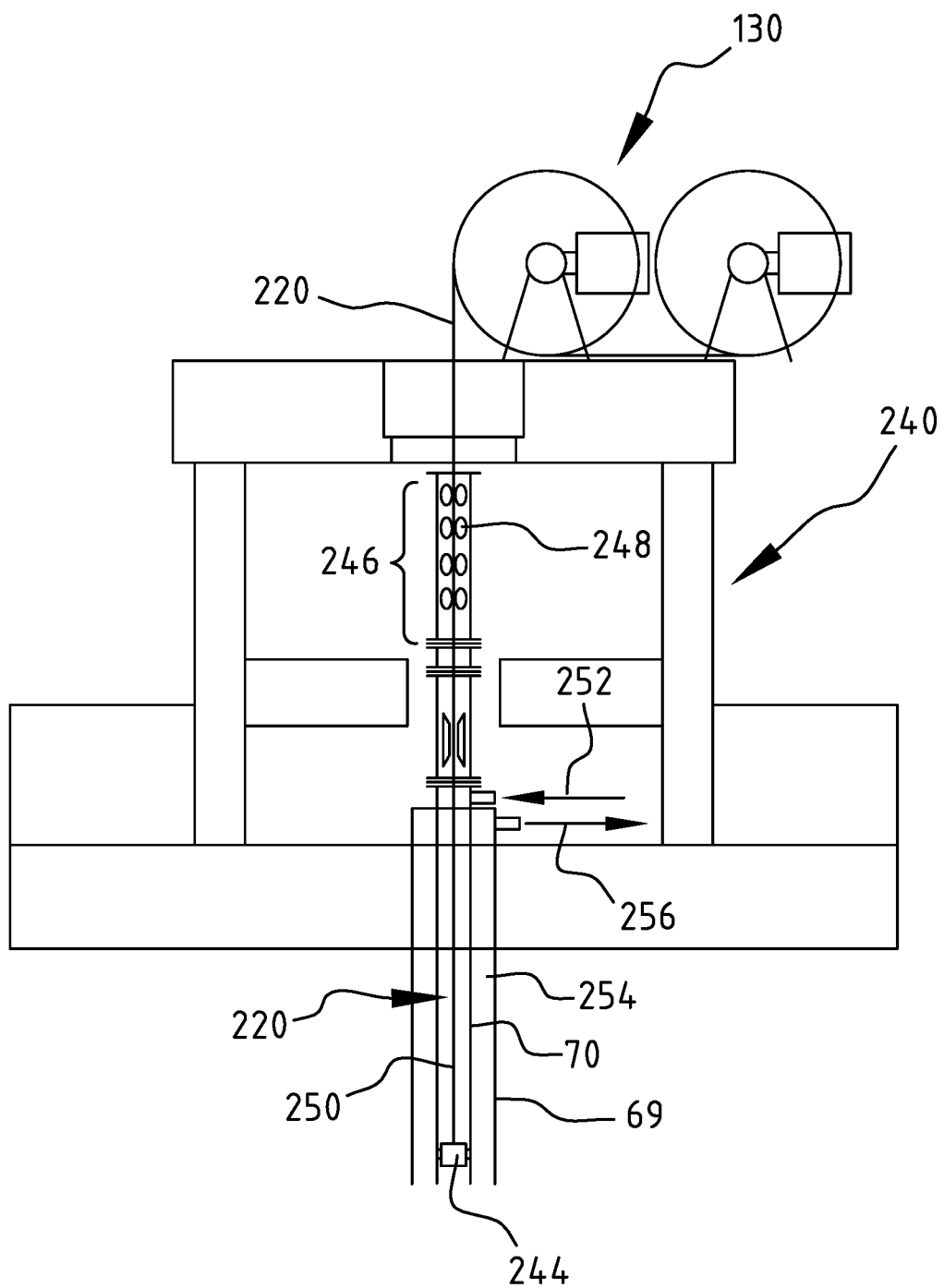
FIG. 33 shows a cross section of an embodiment of a system of the invention for introducing a liner in a wellbore.

An embodiment of application of the liner in a wellbore is shown in FIG. 33. The reel 130 comprising the reeled liner 220 is arranged on a drilling rig 240.

In a first step, an end of the liner 220 is provided with a plug 244. The plug 244 has a dimension substantially equal to an internal diameter of the wellbore tubing to the lined. In the example as shown in FIG. 33, the liner will be arranged on the inner surface of the production tubing 70. The production tubing is arranged within a production casing 69. The plug 244 will substantially plug the inner fluid passage of the production tubing 70.

In a second step, the plug 244, having the liner 220 attached to it, is introduced in the top end of the wellbore tubular 70 (FIG. 33).

In a second step, a folding unit 246 is installed (FIG. 33). Said folding unit may comprise one or more rollers 248 for folding the liner 220 in a predetermined form. Said predetermined form may be a C-shape in cross-section.

In a third step, the plug 244, including the folded liner 250 which is attached to it, is pumped downhole. Herein, a fluid such as water or drilling fluid, may be pumped into the wellbore tubular 70 via inlet 252. Any fluid below the plug 244 can be pumped out of the wellbore via the annulus 254 between the tubing 70 and casing 69, and via outlet 256 (FIGS. 33 and 35).

When the plug has reached a predetermined location in the wellbore, for instance the downhole end 260 of the tubing 70, the liner 220 is fixed at surface and the folding assembly 246 is removed.

Figure 35:
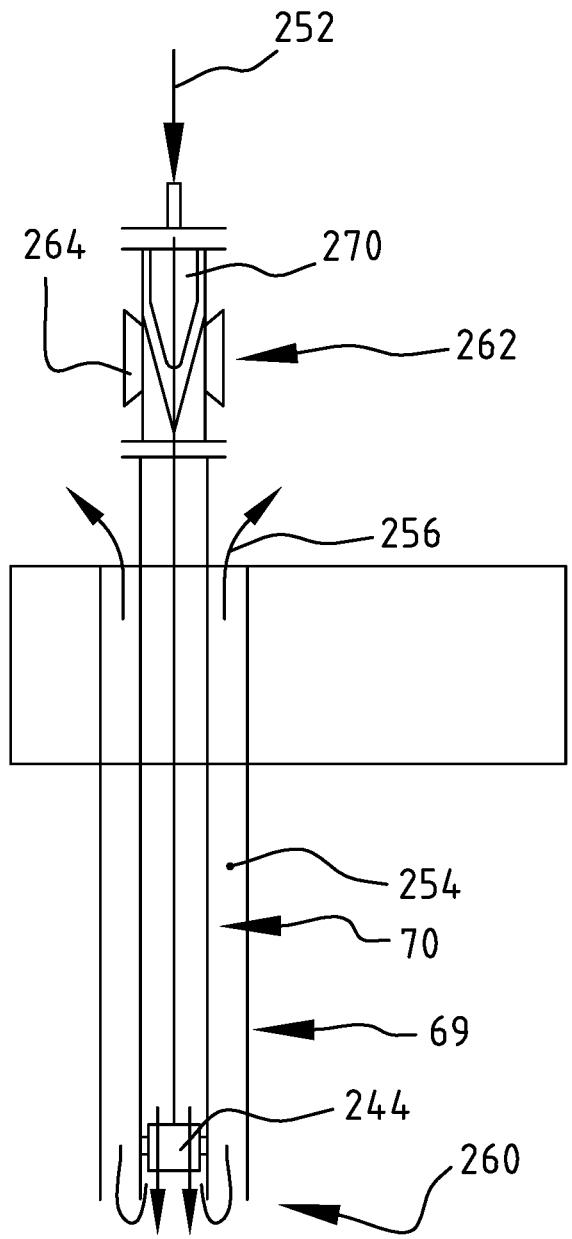
FIG. 35 shows a cross section of a wellbore provided with the system of the invention, as well as a step in introducing the liner in the wellbore.

Referring to FIG. 35, the liner 220 is then cut at surface, creating a free uphole end 262. The uphole end 262 of the liner is opened. The open end 262 is fixated using suitable connecting means 264.

Figure 34:
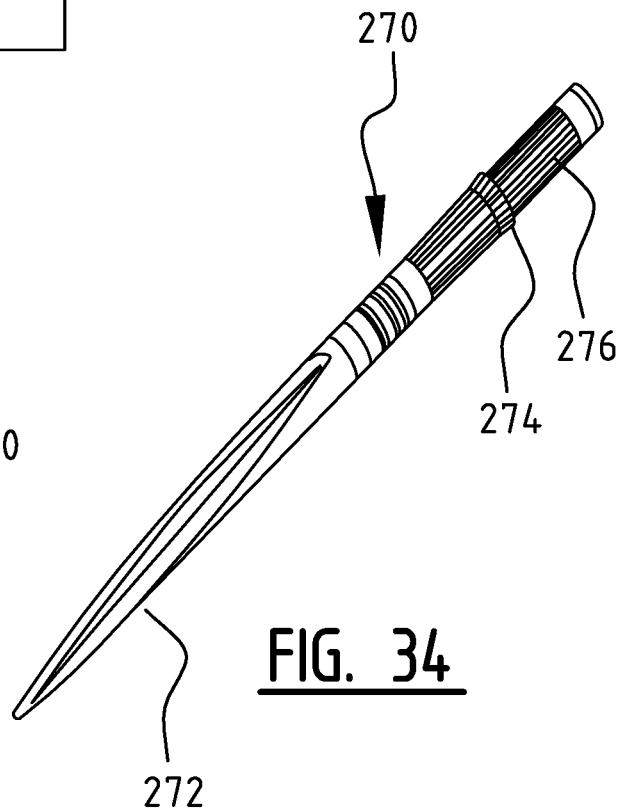
FIG. 34 shows a perspective view of an embodiment of an expander for the system of the invention.

In a next step, an expander tool 270 is introduced in the open uphole end 262 of the liner 220. The expander tool 270 may be pumped into the liner 220 to unfold the liner and press the unfolded liner in engagement with the inner surface of the wellbore tubing 70 (FIG. 37). In an embodiment (FIG. 34), the expander tool may have a front section 272 providing a nose or tip to guide the expander through the liner. A middle section may be provided with a ridge 274 having a diameter close to the inner diameter of the wellbore tubing 70. The ridge diameter may for instance be in the range of about 99% to 99.9% of the inner diameter of the wellbore tubing. An aft end 276 may have a smaller diameter, to allow retrieval of the expander tool.

Optionally, the expander may be retrieved to surface after expansion the liner. Herein, the aft end 276 of the expander tool may be attached to wireline to retrieve the tool. In an embodiment, the expander may be collapsible to simplify the retrieval.

In an embodiment, seals may be applied to the liner at selected locations along the liner (FIG. 38). For instance, one or more seal rings 280 may be introduced in the wellbore tubing 70 and positioned at preselected locations along said tubing. For instance, a seal ring 280 may be positioned at or near the downhole end 260 of the wellbore tubing. Another seal ring may be positioned at a top end of the liner. Thus, the one or more seal rings 280 will provide an additional barrier, preventing wellbore fluids from entering between the liner 220 and the inner surface of the wellbore tubing 70.

Upon retrieval of the expander tool, the expander may expand the one or more seal rings 280 at their respective locations. The expanded seal ring 280 will be forced into the wellbore tubing, creating a seal section 282 due to internal compressive residual stresses (FIG. 39). The latter may be regarded as autofrettage, a metal fabrication technique in which a pressure vessel is subjected to pressure, causing internal portions of the part to yield and resulting in said internal compressive residual stresses.

The liner can be pumped downhole relatively easily, as described above. The liner is relatively thin, for instance 1 mm or less. The thickness of the liner may be in the range of about 200 to 800 µm, for instance about 0.5 mm. The folded liner 250 will, as a result, have a diameter much smaller than the inner diameter (ID) of the wellbore tubular. The ID of production tubing is typically about 4 to 5 inch (about 10 to 15 cm). The folded liner 254 by comparison may, in its collapsed state, have a diameter of less than 3 inch (7.5 cm), for instance 2 to 3 inch (5 to 7.5 cm). Engagement between liner and tubing 70 is minimal as a result. Friction is therefore also relatively low, allowing easy run in of the liner.

Figure 40:
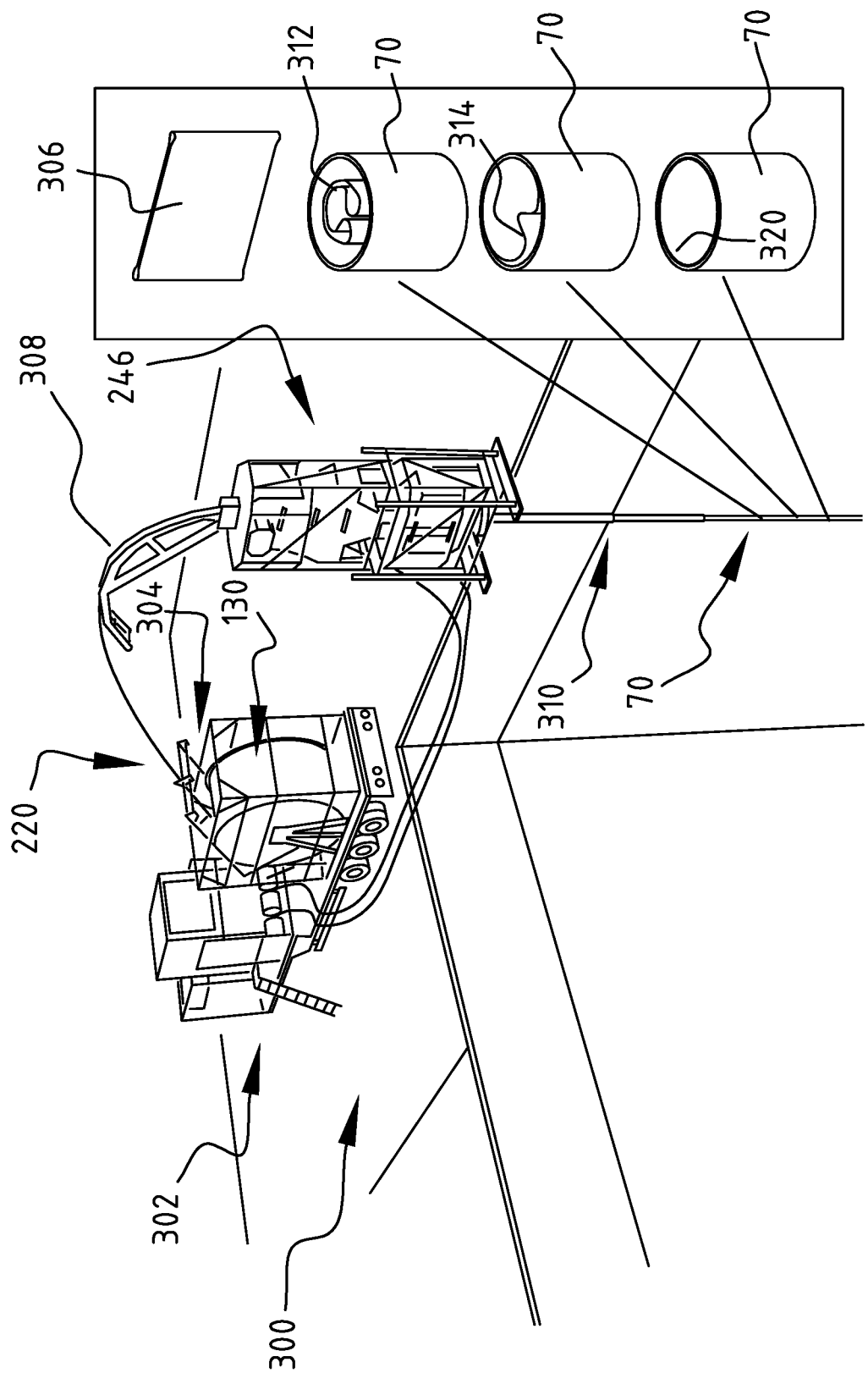
FIG. 40 shows a perspective view of an embodiment of a method of lining a wellbore tubing according to the invention.

FIG. 40 shows a drilling site 300. A truck 302 carrying a reel 130 and corresponding reeling mechanism 304 is arranged at the site 300. The liner 220 is unreeled in a flat form 306 and guided along a guiding structure 308 into the wellbore 310. Folding mechanism 246 folds the liner into a C-shape 312. The C-shaped liner is introduced in the wellbore tubing 70.

Further downhole, or in a subsequent step, the liner 220 may expand in shape. The liner may expand from a partially expanded shape 314 to a tubular shape 320. The expansion process may partially occur by elasticity of the liner. Alternatively, or in addition, the liner may be expanded by introducing pressurized fluid and/or by moving an expander through the liner, as described above.

The liner of the present invention may be any liner suitable for a particular downhole condition. The liner may have one or more metallic layers. The one or more metallic layers may be combined with one or more polymeric layers, as described above. The one or more polymer layers may be applied to the one or more metallic layers in any suitable way, for instance by spray coating or extrusion coating. The above described embodiments herein provide examples, but alternative methods to fabricate the liner may be used as well.

The liner material of the present invention and its application for lining tubing in a wellbore provides a relatively low-cost option while providing the superior corrosion resistance properties of high-performance steel or solid CRA tubing. As the liner material can applied to the tubing after installation thereof in the wellbore, the inner surfaces of the threaded connectors between pipe sections will also be effectively protected against corrosion. The latter allows the use of conventional, relatively low-cost threaded connectors, such as API approved carbon steel connectors.

Cost saving on production tubing, compared to required solid CRA tubing, may exceed 80%. The added liner is relatively thin, thus minimally limiting the inner diameter of the borehole. The invention allows the rehabilitation of older wells in case of souring, increase in water cut, etc.

The present invention is not limited to the above-described embodiments thereof, wherein various modifications are conceivable within the scope of the appended claims. For instance, features of respective embodiments may be combined.

It will be understood that the method and system according to the invention may be used to insert a kilometres long corrosion and leak inhibiting liner downhole along at least a substantial part of the length of an oil and/or gas production tubing from just above a Sliding Side Door (SSD) or Side Pocket Mandrel (SPM) to just below a Sub Surface Safety Valve (SSSV). The unlined upper and lower sections of the production tubing string above the SSSV and below the SSD and/or SPM may be made of a Corrosion Resistant Alloy (CRA).

If the liner is installed within a production tubing string the expander for expanding and unfolding the liner may not be attached to a wireline or Coiled Tubing (CT) assembly but may be delivered to the bottom of the tubing string by the liner itself. The driving force for pushing the expander up through the tubing string may be hydraulic pressure from circulating the well via the annular space between the tubing string and surrounding well casing.

The liner expander may be designed to self adjust its outer circumference to variations in the internal width of surrounding tubing string. Because the tubing string is not plastically deformed, the variations from production remain, and the expander and liner must be able to adjust to the variation (up to about 4 mm difference in internal diameter for a commonly applied production tubing string). This may be achieved by using a leaf spring and/or by a rubber expander.

The expander may also be configured to preserve a residual compression force between the expanded liner and surrounding tubing string after expanding the liner, to ensure that despite elastic relaxation and spring back in the liner, a mechanical interference fit is achieved without plastically deforming the surrounding tubing string.

The top seal will be set at surface, also in a special tubing joint intended for this purpose.

If the liner is installed within a vertical or inclined tubing or casing string, the liner may be provided with metal to metal seals surrounding an upper end and a lower end of the liner to ensure no production fluid can enter between the production tubing and the liner. The lower end seal may be locked to a locking joint in the tubing string.

The corrosion resistant liner may be manufactured from a Corrosion Resistant Alloy (CRA), such as nickel alloy C22, as a kilometres long flattened tube with a wall thickness between 0.3 and 0.7 mm. The curved inner surfaces of the flattened and folded liner may be provided with a gel or thick oil dope to prevent collapse of curves and creation of vertical leak paths.

Protective coatings with thicknesses of a number of micrometres, such as an abrasion resistant layer on the inside of the liner to protect it against wireline interventions and the fluid adsorbing coating on the outside, may be applied during manufacture and before folding of the liner and storage of the folded and flattened liner on a reeling drum.

The fluid absorbing coating will swell on contact with water and/or other fluids trapped between the expanded liner and tubing string and thereby absorb any free water which might remain in the annulus between the liner and the surrounding tubing or casing string, and to prevent any detachment of the liner from the surrounding liner and creation of leak paths. Removal of water and other liquid pockets from the residual space between the expanded liner and a vertical or inclined tubing string is particularly relevant, since even isolated and both axially and circumferentially spaced small pockets of water and/or other liquids may, assisted by vibration and temperature fluctuations, slowly migrate downwards and coalesce into larger water and/or liquid pockets that may entirely circumvent a lower part of the liner and result in liner collapse and/or its detachment from the tubing. In such case isolated gas pockets may accumulate in a similar manner and migrate as enlarged, optionally annular, gas pockets upwardly towards an upper end of the tubing string.

The fluid absorbing coating may comprise a cross-linked acrylate polymer, which is generally known as a Super Absorbent Polymer(SAP) or hydrogel or, in dry state, as "slush powder", which can absorb an amount of fresh water of up to 500 times of its own weight in fresh water, and an amount of mildly saline water of up to 50 times of its own weight.

Super Absorbent Polymers (SAPs) are described in U.S. Pat. No. 7,144,980 and are commonly made by polymerizing acrylic acid blended with sodium hydroxide in the presence of an initiator to form a poly-acrylic acid sodium salt (sometimes referred to as sodium polyacrylate). This SAP is the most common type of SAP made today.

The fluid absorbing coating may also comprise a sticky glue and/or other adhesive to firmly bond the liner to the tubing or casing string and further inhibit collapse and/or detachment of the thin foil liner from the surrounding tubing or casing string.

What is claimed is:

1. A method for lining a tubing string, comprises:
   providing a reeled flat folded liner;
   unreeling the reeled flat folded liner in a flat form;
   folding the flat formed liner into a C-shape;
   inserting the C-shaped liner into a tubing string; and
   unfolding the C-shaped liner to expand the C-shaped liner against an inner surface of the tubing string;
   wherein the step of unfolding the C-shaped liner to expand the C-shaped liner comprises:
   unfolding an end of the C-shaped liner;
   fixating the unfolded end of the C-shaped liner within the tubing string; and
   pumping an expander tool and/or pressurized fluid through the C-shaped liner.

2. The method of claim 1, further comprising expanding the C-shaped liner whereby the C-shaped liner expands from a partially expanded shape to a tubular shape.

3. The method of claim 2, wherein expanding the C-shaped liner partially occurs by elasticity of the C-shaped liner.

4. The method of claim 1, wherein the C-shaped liner is expanded by introducing pressurized fluid into the C-shaped liner.

5. The method of claim 1, wherein the C-shaped liner is expanded by moving an expander through the C-shaped liner.

6. The method of claim 5, wherein a driving force for moving the expander through the C-shaped liner is hydraulic pressure.

7. The method of claim 1, wherein the C-shaped liner has one or more metallic layers.

8. The method of claim 1, wherein the reeled flat folded liner comprises a ductile corrosion resistant metal with a wall thickness less than 1 mm.

9. The method of claim 1, wherein the reeled flat folded liner has an outer surface which is at least partially coated with a fluid absorbing coating, which is induced to absorb fluid trapped between an inner surface of the tubing string and an outer surface of the expanded C-shaped liner.

10. The method of claim 1, wherein the tubing string is a tubing or a casing string in an oil and/or a gas production well.

11. The method of claim 1, wherein the step of providing the reeled flat folded liner comprises:
providing a sheet material;
bending opposite sides of the sheet material toward each other into engagement;
interconnecting the opposite sides of the sheet material with each other; and
reeling the resulting reeled flat folded liner onto a reel.

12. The method of claim 11, wherein said interconnecting the opposite sides of the sheet material is done by welding.

13. The method of claim 1, further comprising transporting the reeled flat folded liner to a wellbore.

14. A system for lining a tubing string, comprises:
a reeled flat folded liner;
a guiding structure configured to guide the reeled flat folded liner in a flat form to the tubing string after unreeling, said guiding structure comprising a folding mechanism to fold the flat formed liner into a C-shape prior to introducing the flat formed liner into the tubing string, wherein the C-shaped liner is inserted into the tubing string; and
means to unfold and to expand the C-shaped liner against an inner surface of the tubing string;
wherein the means to unfold and to expand the C-shaped liner comprises an expander tool comprising a front section, a middle section and an aft end, wherein the front section provides a nose or a tip to guide the expander through the C-shaped liner; and where the middle section is provided with a ridge having a diameter close to an inner diameter of the tubing string, wherein the aft end has a smaller diameter to allow retrieval of the expander tool, wherein the aft end is attached to a wireline tool to retrieve the expander tool.

15. The system of claim 14, wherein the reeled flat folded liner is carried on a truck.

16. The system of claim 15, wherein said truck further comprises a reeling mechanism.

17. The system of claim 14, wherein the expander tool self-adjusts its outer circumference to variations in internal width of the surrounding tubing string.

18. The system of claim 14, wherein the tubing string is a tubing or a casing string in an oil and/or a gas production well.

19. A method for lining a tubing string, comprising:
providing a reeled flat folded liner;
unreeling the reeled flat folded liner in a flat form;
folding the flat formed liner into a C-shape;
inserting the C-shaped liner into a tubing string; and
unfolding the C-shaped liner to expand the C-shaped liner against an inner surface of the tubing string;
wherein the folded liner has an outer surface which is at least partially coated with a fluid absorbing coating, which is induced to absorb fluid trapped between an inner surface of the tubing string and an outer surface of the expanded C-shaped liner.

20. A system for lining a tubing string, comprising:
a reeled flat folded liner;
a guiding structure configured to guide the reeled flat folded liner in a flat form to the tubing string after unreeling, said guiding structure comprising a folding mechanism to fold the flat formed liner into a C-shape prior to introducing the flat formed liner into a tubing string;
inserting the C-shaped liner into the tubing string;
means to unfold and to expand the C-shaped liner against an inner surface of the tubing string; and
connecting means to fixate an open end of the C-shaped liner within the tubing string;
wherein the means to unfold and to expand the C-shaped liner comprises:
an expander tool; and
a pump configured to pump the expander tool through the C-shaped liner.

21. The system of claim 20, wherein the expander tool comprises a front section, a middle section and an aft end, wherein the front section provides a nose or a tip to guide the expander through the C-shaped liner; and where the middle section is provided with a ridge having a diameter close to an inner diameter of the tubing string.

22. The system of claim 21, wherein the expander tool further comprises an aft end that has a smaller diameter than the middle section, to allow retrieval of the expander tool.

23. The system of claim 22, wherein the aft end is attached to a wireline tool to retrieve the expander tool.

24. The system of claim 20, wherein the tubing string is a tubing or a casing string in an oil and/or a gas production well.

* * * * *